(12) United States Patent
Tamura et al.

(10) Patent No.: US 6,498,511 B2
(45) Date of Patent: Dec. 24, 2002

(54) RECEIVER, HYBRID CIRCUIT, DRIVER CIRCUIT, AND SIGNAL TRANSMISSION SYSTEM FOR BIDIRECTIONAL SIGNAL TRANSMISSION FOR CARRYING OUT SUCH SIGNAL TRANSMISSION IN BOTH DIRECTIONS SIMULTANEOUSLY

(75) Inventors: Hirotaka Tamura, Kawasaki (JP); Yuji Takahashi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/813,798

(22) Filed: Mar. 22, 2001

(65) Prior Publication Data

US 2002/0041193 A1 Apr. 11, 2002

(30) Foreign Application Priority Data

Oct. 2, 2000 (JP) ........................................ 2000-302788
Oct. 16, 2000 (JP) ........................................ 2000-315600

(51) Int. Cl.[7] .......................................... H03K 19/094
(52) U.S. Cl. .............................. 326/86; 326/90; 326/30; 370/282; 370/284; 375/219; 375/220
(58) Field of Search .............................. 326/30, 86, 90; 370/282, 284; 375/219, 220

(56) References Cited

U.S. PATENT DOCUMENTS 5,485,488 A * 1/1996 Van Brunt et al. .......... 375/257
5,802,103 A   9/1998 Jeong ........................... 375/220
6,226,331 B1 * 5/2001 Gammbuzza ................ 375/258
6,304,106 B1 * 10/2001 Cecchi et al. ................. 326/86

FOREIGN PATENT DOCUMENTS

DE    38 72 494 T2    7/1992
DE    692 11584 T2    6/1996
DE    196 10 090 C1   11/1996

OTHER PUBLICATIONS

Tietze et al., Halbleiter–Schaltungstechnik, 11. Auflage, Spring–Verlag 1999, pp. 430–437 and 1019–1023 (1999).

* cited by examiner

Primary Examiner—Michael Tokar
Assistant Examiner—V. Tan
(74) Attorney, Agent, or Firm—Arent Fox Kintner Plotkin & Kahn

(57) ABSTRACT

A receiver for bidirectional signal transmission, where signals are sent and received in both directions over a signal transmission line, has a signal line, a first hold capacitor, a signal line voltage buffer circuit, a hybrid circuit, and a decision circuit. The signal line is connected to the signal transmission line, the first hold capacitor is used to hold a signal, and the signal line voltage buffer circuit is used to buffer a voltage of the signal line. Further, the hybrid circuit is used to output a received signal by separating the received signal from the signal line voltage buffered by the buffer circuit, and the decision circuit is used to make a decision on the logic value of the received signal separated and output by the hybrid circuit.

22 Claims, 29 Drawing Sheets

RECEIVER, HYBRID CIRCUIT, DRIVER CIRCUIT, AND SIGNAL TRANSMISSION SYSTEM FOR BIDIRECTIONAL SIGNAL TRANSMISSION FOR CARRYING OUT SUCH SIGNAL TRANSMISSION IN BOTH DIRECTIONS SIMULTANEOUSLY

BACKGROUND OF THE INVENTION

1. Field of the Invention

The present invention relates to a signal transmission technology for transmitting signals at high speed between a plurality of LSI chips or a plurality of devices or circuit blocks within a single chip, or between a plurality of boards or machines, and more particularly, to a receiver, hybrid circuit, driver circuit, and signal transmission system for bidirectional signal transmission for carrying out such signal transmission in both directions simultaneously.

2. Description of the Related Art

In recent years, the performance of components used to construct computers and other information processing apparatuses has improved greatly; indeed, dramatic performance improvements have been made, for example, for semiconductor memory devices such as DRAM (Dynamic Random Access Memory) and processors and the like. The improvements in the performance of semiconductor memory devices, processors, and the like have come to the point where system performance cannot be improved further unless the speed of signal transmission between components or elements is increased. Stated more specifically, the speed of signal transmission between a main storage device such as a DRAM and a processor (i.e., between LSIs), for example, is becoming a bottleneck impeding performance improvement for a computer as a whole.

The need for the improvement of signal transmission speed is increasing not only for signal transmission between machines or boards (printed wiring boards), such as between a server and a main storage device or between servers connected via a network, but also for signal transmission between chips or between devices or circuit blocks within a chip because of increasing integration and increasing size of semiconductor chips, decreasing supply voltage levels (low-voltage-swing signals), etc. It is therefore desired to provide a receiver and hybrid circuit (hybrid) for bidirectional signal transmission, capable of achieving high-speed transmission. It is also desired to provide a driver circuit having a linear output impedance suitable for bidirectional transmission or multilevel transmission that can increase the efficiency of use of a signal transmission line or can reduce the number of signal lines without decreasing the signal transmission speed, and a signal transmission system using such a driver circuit.

In order to address the increase in the amount of data transmission between LSIs or between boards or machines, signal transmission speed per pin must be increased. This is to avoid an increase in package cost, etc. due to increased pin count. As a result, inter-LSI signal transmission rates exceeding 1 Gbps, for example, have been achieved in recent years, and in the future (three to eight years from now) signal transmission rates are expected to reach extremely high values (achieving very high signal transmission rates) such as 4 Gbps or even 10 Gbps.

At such high signal frequencies, however, loss occurs in the high signal frequencies due to the skin effect of a signal transmission line, which, coupled with such factors as high-frequency component reflections due to the effects of parasitic inductance and parasitic capacitance, limits the bandwidth of the transmission line. Such limitations may be alleviated, for example, by using large-core cables, but in applications where a large number of signal lines need to be bundled in parallel for large-capacity data transmission, there is a limit to increasing the diameter of the cable bundle. In this way, as the signal transmission frequency increases, there occurs a situation where the signal transmission line itself becomes a bottleneck in signal transmission.

To eliminate such a bottleneck, various techniques are employed, such as bidirectional transmission that transmits signals in both directions simultaneously and multilevel transmission that transmits a large number of bits using one symbol. In bidirectional transmission, a hybrid circuit is used that has the function of separating the net signal voltage for output by subtracting it from the signal voltage of the signal line the signal being sent out by the driver of the hybrid circuit.

Further, in high-speed signal transmission, it is practiced to terminate a signal line in the characteristic impedance of the transmission line (impedance matching) because non-matched line termination would cause signal reflections resulting in the disturbance of signal waveform. This impedance matching must be done not only at the receiving end of the signal line but also at the transmitting end. This is necessary to absorb reflections from impedance un-matched points, such as a connector and a package, at the transmitting end as well.

Among known methods practiced to reduce the number of signal lines are bidirectional transmission and multilevel transmission that transmit a plurality of bits using one symbol, but these methods require not only that the value of line termination be matched to the line impedance, but also that its nonlinearity be minimized. This is because if nonlinearity exists, in bidirectional transmission an error would occur when subtracting from the received signal the contribution being made by the driver at the receiving end, while in the case of multilevel transmission, the number of bits per symbol would be limited.

The prior art and problems associated with the prior art will be described in detail later with reference to drawings.

SUMMARY OF THE INVENTION

An object of the present invention is to provide a receiver and hybrid circuit for bidirectional signal transmission, that resolve the problem of the kick-back noise that a hybrid circuit has on its input side. Another object of the invention is to achieve bidirectional transmission or multilevel transmission capable of utilizing the bandwidth of transmission line efficiently by providing linearity to the impedance of a driver circuit.

According to the present invention, there is provided a receiver for bidirectional signal transmission in which signals are sent and received in both directions over a signal transmission line, comprising a signal line connected to the signal transmission line; a first hold capacitor for holding a signal; a signal line voltage buffer circuit for buffering a voltage of the signal line; a hybrid circuit for outputting a received signal by separating the received signal from the signal line voltage buffered by the buffer circuit; and a decision circuit for making a decision on the logic value of the received signal separated and output by the hybrid circuit.

The decision circuit may generate a sum of a signal value obtained at the time that the hybrid circuit makes a decision on the logic value of the received signal separated and output by the hybrid circuit and a value obtained by multiplying an earlier obtained given signal value by a coefficient, and makes the decision by using the value of the generated sum. The buffer circuit may be a voltage buffer circuit, and the hybrid circuit may be a capacitive coupling hybrid circuit. The voltage buffer circuit may have a voltage gain of nearly unity, and the voltage buffer circuit and the signal line may be coupled together by a capacitor, and wherein during a non-operating period of the voltage buffer circuit, a node on the input side of the capacitor may be connected to an output of the voltage buffer circuit and an input node of the voltage buffer circuit may be precharged to a prescribed potential, thereby compensating for an offset voltage of the voltage buffer circuit.

The receiver may further comprise a reference voltage output circuit for controlling, in accordance with an output sequence of a driver a reference voltage for driving, an input node of the capacitive coupling hybrid circuit. The reference voltage output circuit may comprise a control voltage generating circuit for generating a plurality of control voltages in accordance with data of a signal sequence being sent out by the driver; a plurality of reference voltage buffers for receiving the control voltages and for generating respective reference voltages; and a selection circuit for selecting an output of one of the plurality of reference voltage buffers in accordance with the data of the signal sequence.

The buffer circuit may be a transconductor for performing voltage-to-current conversion; and the hybrid circuit may convert the voltage of the signal line and a signal voltage of a replica driver into currents by using the transconductor, and may cause a current corresponding to the difference between the converted currents to flow into a load device to obtain the difference between the voltage of the signal line and the signal voltage of the replica driver, thereby separating the received signal for output. An offset compensating circuit including a first transistor and a second hold capacitor may be connected to the load device to which the current from the transconductor is supplied in the hybrid circuit; and in the offset compensating circuit, during a non-operating period of the buffer circuit, the first transistor may be connected in a diode-connected configuration and the second hold capacitor may be connected to a gate of the first transistor, while during an operating period of the buffer circuit, voltage on the second hold capacitor holds the gate voltage of the first transistor.

The current from the transconductor may be held using a hold circuit of a folded structure having a third hold capacitor and a second transistor, and wherein during a sampling period, the third hold capacitor may be connected to a gate of the second transistor connected in a diode-connected configuration and, during a holding period, the third hold capacitor may be disconnected from the gate and an output current from the hold circuit may be coupled to a load device that follows the hold circuit, thereby generating a weighted sum of signals taken at two adjacent sampling instants and thereafter making the decision using the weighted sum. The buffer circuit may include at an output stage thereof a push-pull source follower stage comprising an nMOS device and a pMOS device.

Further, according to the present invention, there is provided a receiver for bidirectional signal transmission in which signals are sent and received in both directions over a signal transmission line, comprising a signal line connected to the signal transmission line; a first hold capacitor for holding a signal; a hybrid circuit for outputting a received signal by separating the received signal from a voltage of the signal line; a reference voltage output circuit for outputting in accordance with an output sequence of a driver a reference voltage for driving an input node of the hybrid circuit; and a decision circuit for making a decision on the logic value of the received signal separated and output by the hybrid circuit.

The reference voltage output circuit may comprise a control voltage generating circuit for generating a plurality of control voltages in accordance with data of a signal sequence being sent out by the driver; a plurality of reference voltage buffers for receiving the control voltages and for generating respective reference voltages; and a selection circuit for selecting an output of one of the plurality of reference voltage buffers in accordance with the data of the signal sequence.

Further, according to the present invention, there is also provided a hybrid circuit for bidirectional signal transmission in which signals are sent and received in both directions over a signal transmission line, wherein the hybrid circuit is a capacitive coupling hybrid circuit having a hold capacitor for holding a signal, and wherein an input signal from the signal transmission line is supplied to the hold capacitor via a buffer circuit, and a received signal is output by separating the received signal from a signal line voltage buffered by the buffer circuit.

The hybrid circuit may further comprise a reference voltage output circuit for outputting in accordance with an output sequence of a driver a reference voltage for driving an input node of the capacitive coupling hybrid circuit. The reference voltage output circuit may comprise a control voltage generating circuit for generating a plurality of control voltages in accordance with data of a signal sequence being sent out by the driver; a plurality of reference voltage buffers for receiving the control voltages and for generating respective reference voltages; and a selection circuit for selecting an output of one of the plurality of reference voltage buffers in accordance with the data of the signal sequence.

The hybrid circuit may receive an output signal of a replica driver, which outputs a signal corresponding to an output of a driver that amplifies a signal and outputs the amplified signal onto the signal transmission line, an input signal from the signal transmission line, and a reference voltage, and separates the received signal for output. The hybrid circuit may convert the voltage of the signal transmission line and the output voltage of the replica driver into currents by using a transconductor, and may cause a current corresponding to the difference between the converted currents to flow into a load device to obtain the difference between the voltage of the signal transmission line and the output voltage of the replica driver, thereby separating the received signal for output. An offset compensating circuit may comprise a first transistor and a first hold capacitor may be connected to the load device to which the current from the transconductor is supplied in the hybrid circuit; and in the offset compensating circuit, during a non-operating period of the buffer circuit, the first transistor may be connected in a diode-connected configuration and the first hold capacitor may be connected to a gate of the first transistor, while during an operating period of the buffer circuit, voltage on the first hold capacitor holds the gate voltage of the first transistor.

The current from the transconductor may be held using a hold circuit of a folded structure having a second hold capacitor and a second transistor, and wherein, during a sampling period, the second hold capacitor may be connected to a gate of the second transistor connected in a diode-connected configuration, and during a holding period, the second hold capacitor may be disconnected from the gate and an output current from the hold circuit may be coupled to a load device that follows the hold circuit, thereby generating a weighted sum of signals taken at two adjacent sampling instants and thereafter making the decision using the weighted sum.

According to the present invention, there is also provided a driver circuit comprising a first transistor having a first terminal connected to an output signal line, a second terminal connected to a first power supply line, and a control terminal; a second transistor connected in parallel with the first transistor and having a first terminal, a second terminal, and a control terminal; and a control circuit for controlling a voltage to be applied to the control terminal of the second transistor, in accordance with a potential of the output signal line.

The first power supply line may be a high voltage supply line, and the first transistor may operate to pull up the output signal line. The first power supply line may be a low voltage supply line, and the first transistor may operate to pull down the output signal line. The control circuit may be a voltage shift circuit which produces a shift voltage by shifting the voltage of the output signal line by a given value in an approximating manner, and which applies the shift voltage to the control terminal of the second transistor. The voltage shift circuit may produce the shift voltage by flowing current through a voltage shifting load device connected to the output signal line. The voltage shifting load device and the first and second transistors may be of the same channel conductivity type. The driver circuit may further comprise an injecting circuit for injecting a charge or current for speeding up an OFF to ON change of the voltage applied to the control terminal of the second transistor when switching the second transistor from an OFF state to an ON state.

Further, according to the present invention, there is provided a diver circuit comprising a first transistor having a first terminal connected to an output signal line, a second terminal connected to a high voltage supply line, and a control terminal, the first transistor operating to pull up the output signal line; a second transistor connected in parallel with the first transistor and having a first terminal, a second terminal, and a control terminal; a first control circuit for controlling a voltage to be applied to the control terminal of the second transistor, in accordance with a potential of the output signal line; a third transistor having a first terminal connected to the output signal line, a second terminal connected to a low voltage supply line, and a control terminal, the third transistor operating to pull down the output signal line; a fourth transistor connected in parallel with the second transistor and having a first terminal, a second terminal, and a control terminal; and a second control circuit for controlling a voltage to be applied to the control terminal of the fourth transistor, in accordance with the potential of the output signal line.

The driver circuit may be a differential constant-current driver, and the paralleled first and second transistors and the paralleled third and fourth transistors may act loads for the differential constant-current driver. The first control circuit may be a first shift voltage circuit which produces a first shift voltage by shifting the voltage of the output signal line of the driver by a given value in an approximating manner, and which applies the first shift voltage to the control terminal of the second transistor, and the second control circuit may be a second shift voltage circuit which produces a second shift voltage by shifting the voltage of the output signal line of the driver by a given value in an approximating manner, and which applies the second shift voltage to the control terminal of the fourth transistor. The first and second voltage shift circuits may produce the first and second shift voltages, respectively, by flowing current through voltage shifting load devices connected to the output signal line. The voltage shifting load devices and the first to fourth transistors may be of the same channel conductivity type.

The driver circuit may further comprise a first switch circuit inserted between the first control circuit and the control terminal of the second transistor, and a second switch circuit inserted between the second control circuit and the control terminal of the fourth transistor, and wherein, when either a pull-up load device constructed from the first and second transistors or a pull-down load device constructed from the third and fourth transistors is turned ON, a corresponding one of the first and second switch circuits may be turned ON and the other switch circuit may be turned OFF. The driver circuit may further comprise a pull-up circuit for pulling up the control terminal of the second transistor, and a pull-down circuit for pulling down the control terminal of the fourth transistor, and wherein, when the first switch circuit is turned OFF, the pull-up circuit may pull up the control terminal of the second transistor, and when the second switch circuit is turned OFF, the pull-down circuit may pull down the control terminal of the fourth transistor.

In addition, according to the present invention, there is provided a driver circuit comprising a first transistor having a first terminal connected to an output signal line, a second terminal connected to a first power supply line, and a control terminal; and a control circuit for controlling a voltage to be applied to the control terminal of the first transistor, in accordance with a control signal and a potential of the output signal line.

The first power supply line may be a high voltage supply line, and the first transistor may operate to pull up the output signal line. The first power supply line may be a low voltage supply line, and the first transistor may operate to pull down the output signal line. The control circuit may comprise a resistive device for connecting between the output signal line and the control terminal of the first transistor, and a resistive device control circuit for controlling the resistance of the resistive device by a voltage.

The control circuit may be a circuit constructed by combining a resistive device and a switch device. The switch device may be a transistor or a diode, and the control circuit may produce an output voltage whose dependence on the control signal and the potential of the output signal line is obtained by a so-called polygonal approximation circuit. The control circuit may include a capacitor for connecting between the output signal line and the control terminal of the first transistor. The control circuit may include a diode-connected transistor for connecting between the output signal line and the control terminal of the first transistor. A device for connecting between the output signal line and the control terminal of the first transistor may be of the same conductivity type as the first transistor, and a circuit for applying a bias current to the control circuit may be controlled so as to provide an impedance scaled to the impedance level of the first transistor.

According to the present invention, there is also provided a diver circuit comprising a first transistor having a first terminal connected to an output signal line, a second terminal connected to a high voltage supply line, and a control terminal, the first transistor operating to pull up the output signal line; a first control circuit for controlling a voltage to be applied to the control terminal of the first transistor, in accordance with a first control voltage and a potential of the output signal line; a second transistor having a first terminal connected to the output signal line, a second terminal connected to a low voltage supply line, and a control terminal, the second transistor operating to pull down the output signal line; and a second control circuit for controlling a voltage to be applied to the control terminal of the second transistor, in accordance with a second control signal and the potential of the output signal line.

The first and second control circuits may each comprise a resistive device for connecting between the output signal line and the control terminal of a corresponding one of the first and second transistors, and a resistive device control circuit for controlling the resistance of the resistive device by a voltage. The first and second control circuits may be each constructed by combining a resistive device and a switch device. The switch device may be a transistor or a diode, and the first and second control circuits may each produce an output voltage whose dependence on the first or second control signal and the potential of the output signal line is obtained by a so-called polygonal approximation circuit.

The first and second control circuits may each include a capacitor for connecting between the output signal line and the control terminal of the first transistor. The first and second control circuits may each include a diode-connected transistor for connecting between the output signal line and the control terminal of a corresponding one of the first and second transistors. A device for connecting between the output signal line and the control terminal of a corresponding one of the first and second transistors may be of the same conductivity type as the first and second transistors, and a circuit for applying a bias current to the first and second control circuits may be controlled so as to provide an impedance scaled to the impedance level of the first and second transistors.

In addition, according to the present invention, there is also provided a signal transmission system having a first driver circuit, a second driver circuit, and a signal transmission line; the first driver circuit and the second driver circuit being coupled through the signal transmission line, and bidirectional signal transmission being performed with each driver acting as a receiving end of a signal transmitted from the other through the signal transmission line, wherein each of the first and second driver circuit comprises the above described features.

BRIEF DESCRIPTION OF THE DRAWINGS

The present invention will be more clearly understood from the description of the preferred embodiments as set forth below with reference to the accompanying drawings, wherein.

DESCRIPTION OF THE PREFERRED EMBODIMENTS

Before proceeding to a detailed description of the preferred embodiments of a receiver and hybrid circuit for bidirectional signal transmission according to a first mode of the present invention, a receiver and hybrid circuit for bidirectional signal transmission according to the prior art and the problem associated with the prior art will be described with reference to drawings.

Figure 1:
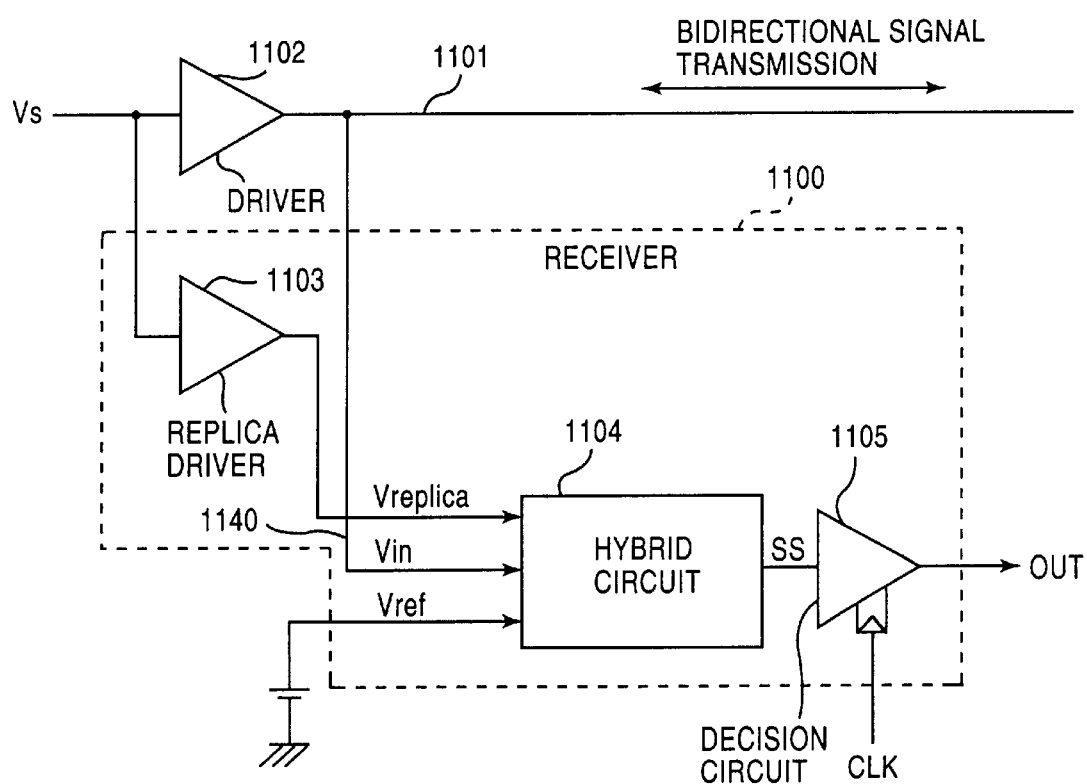
FIG. 1 is a diagram schematically showing one example of a bidirectional signal transmission system.

FIG. 1 is a diagram schematically showing one example of a bidirectional signal transmission system. In FIG. 1, reference numeral 1100 is a receiver, 1101 is a signal transmission line (bidirectional signal transmission line), 1102 is a driver, 1103 is a replica driver, 1104 is a hybrid circuit, and 1105 is a decision circuit (clocked amplifier). FIG. 1 shows a single-ended bidirectional signal transmission system, but the basic principle is the same for a differential system. It will also be noted that the present invention is applicable to both single-ended transmission and differential (complementary signal) transmission, and each of the embodiments given later will be described by choosing the single-ended or differential configuration, whichever is appropriate.

As shown in FIG. 1, the driver 1102, which amplifies the signal (transmit signal) Vs to be transmitted to the other end and outputs the amplified signal on the signal transmission line 1101, and the receiver 1100, which receives the signal (received signal) transmitted from the other end, are provided at one end of the signal transmission line 1101. A similar driver 1102 and receiver 1100 are also provided at the other end of the signal transmission line 1101.

The receiver 1100 includes the replica driver 1103, hybrid circuit 1104, and decision circuit 1105. The replica driver 1103 outputs a signal equivalent to the transmit signal Vs that has been amplified by the driver 1102 and output on the signal transmission line 1101. The output voltage (output signal) of the replica driver 1103 is supplied as Vreplica to the hybrid circuit 1104.

A signal line voltage (input voltage) Vin from the signal transmission line 1101 is input via a signal line 1140 to the hybrid circuit 1104, to which a reference voltage (prescribed DC voltage) Vref is also input. The decision circuit 1105 makes a decision on the logic level of the input signal at the input timing of a clock signal CLK.

Figure 2A:
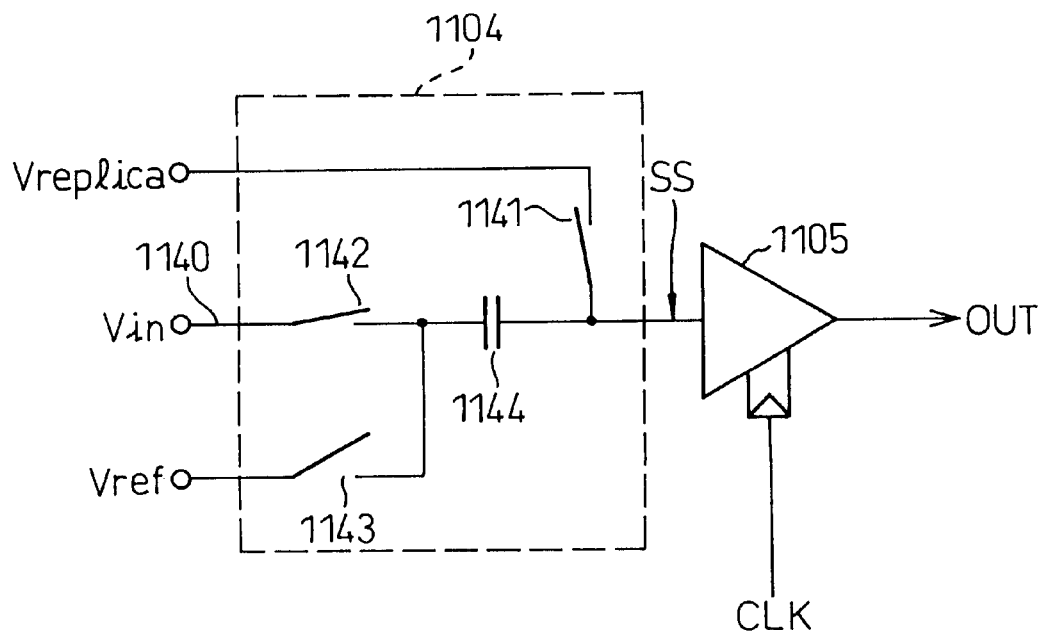
FIGS. 2A and 2B are diagrams for explaining one example of a prior art hybrid circuit for bidirectional signal transmission.
Figure 2B:
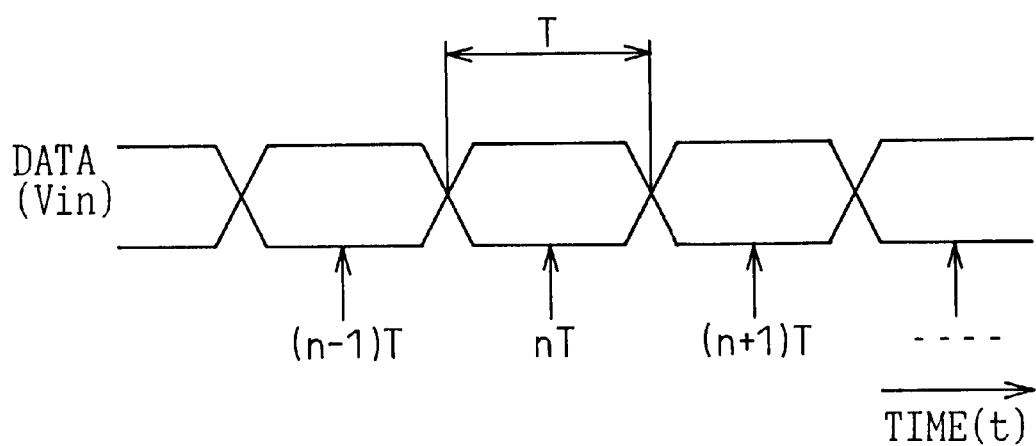

FIGS. 2A and 2B are diagrams for explaining one example of the prior art hybrid circuit (capacitive coupling hybrid circuit) for bidirectional signal transmission: FIG. 2A is a circuit diagram schematically showing the hybrid circuit 1104, and FIG. 2B is a diagram showing the relationship between data (input signal Vin) and time t. In FIG. 2A, reference numerals 1141 to 1143 indicate switches, and 1144 designates a hold capacitor.

In the hybrid circuit 1104 shown in FIG. 2A, first the switches 1141 and 1142 are turned on and the switch 1143 is turned off. As a result, the signal line voltage Vin from the signal transmission line 1101 and the output voltage (replica voltage) Vreplica of the replica driver 1103 are applied to the respective ends of the hold capacitor 1144. Here, when time t=nT (see FIG. 2B), Vreplica(nT)−Vin(nT) is held on the hold capacitor 1144 (the capacitor is charged).

Next, when the switches 1141 and 1142 are turned off and the switch 1143 is turned on, the output (the received signal separated and output) SS of the hybrid circuit 1104 becomes Vref+[Vreplica(nT)−Vin(nT)], which is equal to the signal line voltage (input signal) Vin of the signal transmission line 1101 from which the contribution from the output of the driver 1102 has been eliminated. The decision circuit 1105 makes a decision on the logic level of the signal SS to recognize the signal received from the other end.

It is thus known to provide the capacitive coupling hybrid circuit 1104 that separates the receive signal by taking the difference between the signal line voltage Vin and the replica voltage Vreplica, for example, by using capacitive coupling. The capacitive coupling hybrid circuit 1104 has the advantage of excellent linearity, but the disadvantage is that the charge/discharge current for charging/discharging the capacitor flows from the input terminals and this charge/discharge current generates noise (kick-back noise) to the input side. Depending on the circuit configuration, the kick-back noise may arise from the decision circuit 1105.

That is, in the prior art bidirectional signal transmission, since the signal line voltage (input signal) Vin from the signal transmission line 1101 is directly input to the hybrid circuit 1104, the influence of the charge/discharge current, etc. due to the hold capacitor 1144 may be directly transmitted to the signal transmission line 1101 and may affect the transmission signal waveform, causing errors in signal transmission.

Embodiments of a receiver and hybrid circuit for bidirectional signal transmission according to the first mode of the present invention will be described below with reference to drawings.

Figure 3:
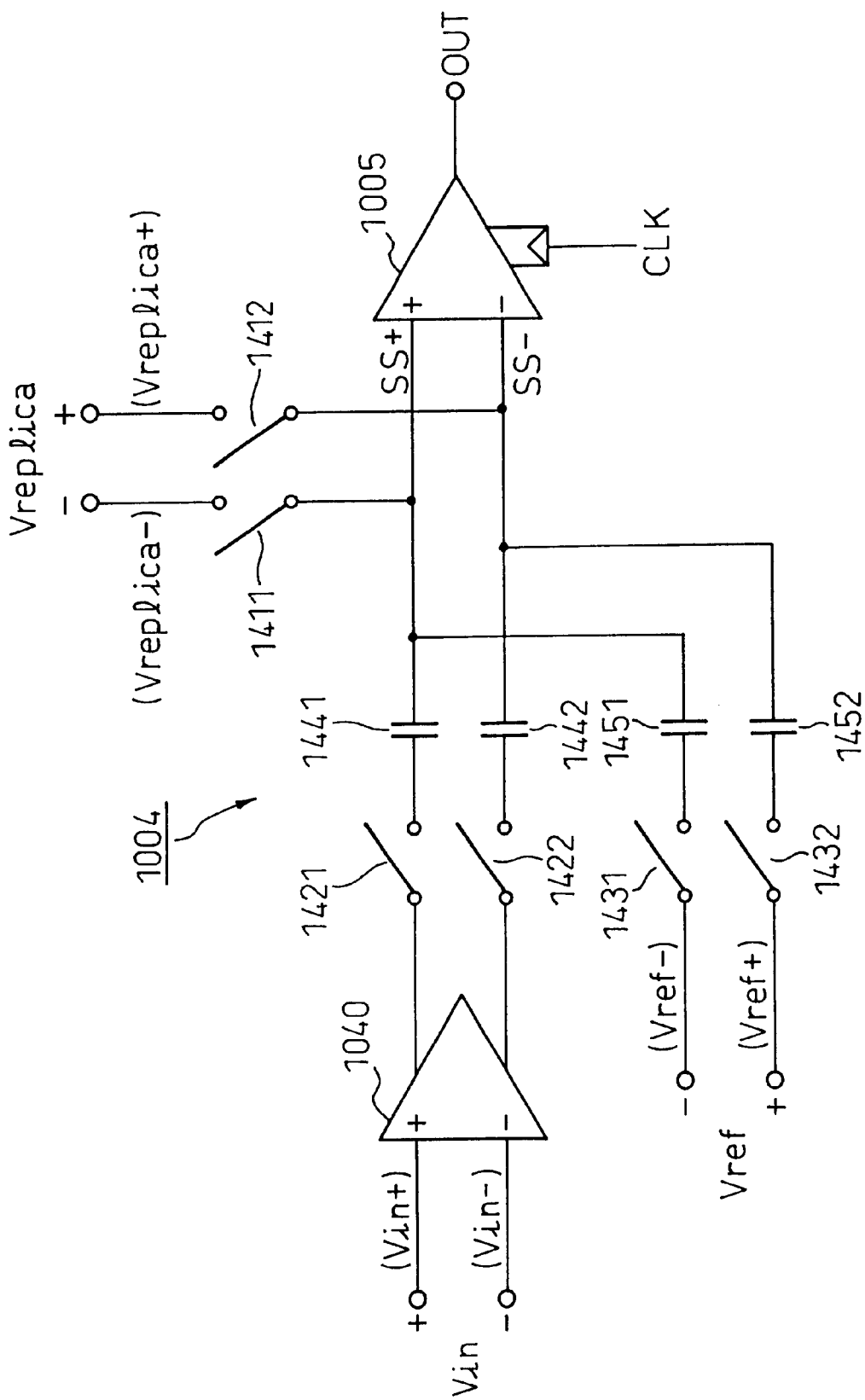
FIG. 3 is a circuit diagram showing the basic functional configuration of a hybrid circuit for bidirectional signal transmission according to a first mode of the present invention.

FIG. 3 is a circuit diagram showing the basic functional configuration of the hybrid circuit for bidirectional signal transmission according to the first mode of the present invention. In FIG. 3, reference numeral 1004 is the hybrid circuit, 1005 is a decision circuit, 1040 is a buffer circuit, 1411, 1412, 1421, 1422, 1431, and 1432 are switches, and 1441, 1442, 1451, and 1452 are capacitors. FIG. 3 shows a differential bidirectional signal transmission system, but it will be appreciated that the present invention is equally applicable to a single-ended system.

As shown in FIG. 3, in the hybrid circuit 1004 of the present invention, the sampling capacitors (hold capacitors) 1441 and 1442 are charged and discharged using the input buffer circuit (the buffer circuit) 1040, so that the charge/discharge current does not flow to the input Vin side (the signal transmission line 1101 side) and kick-back (kick-back noise) is reduced.

Here, when the buffer circuit 1040 is a voltage buffer circuit, the output voltage of the voltage buffer circuit (1040) charges the capacitors 1441 and 1442 directly. On the other hand, when the buffer circuit 1040 is a transconductor which converts a voltage to a current, the output current of the transconductor is input to a hold circuit comprising a capacitor connected in parallel with a diode-connected load transistor, and the voltage held on this capacitor is sampled, as will be described in detail later.

In either case, since the charge current to the holding means (hold capacitor or hold circuit) is supplied from the buffer circuit or the transconductor, the kick-back is reduced.

When the buffer circuit is used, the offset voltage of the buffer circuit becomes a problem, but this can be compensated for by setting the input to zero (connecting the input to a reference voltage) during the non-operating period of the buffer circuit and by accumulating its output (offset output) in an output capacitor. For example, the compensation can be done by inverting the accumulated offset output (in the case of a differential configuration, this can be accomplished by just crossing the signal lines) and using it as a reference voltage.

In this way, according to the first mode of the present invention, since the sampling capacitors necessary to construct the hybrid circuit and the equalizer that follows it are charged and discharged using the buffer circuit, kick-back noise can be reduced, and this facilitates, for example, parallel operation of many receivers.

Figure 4:
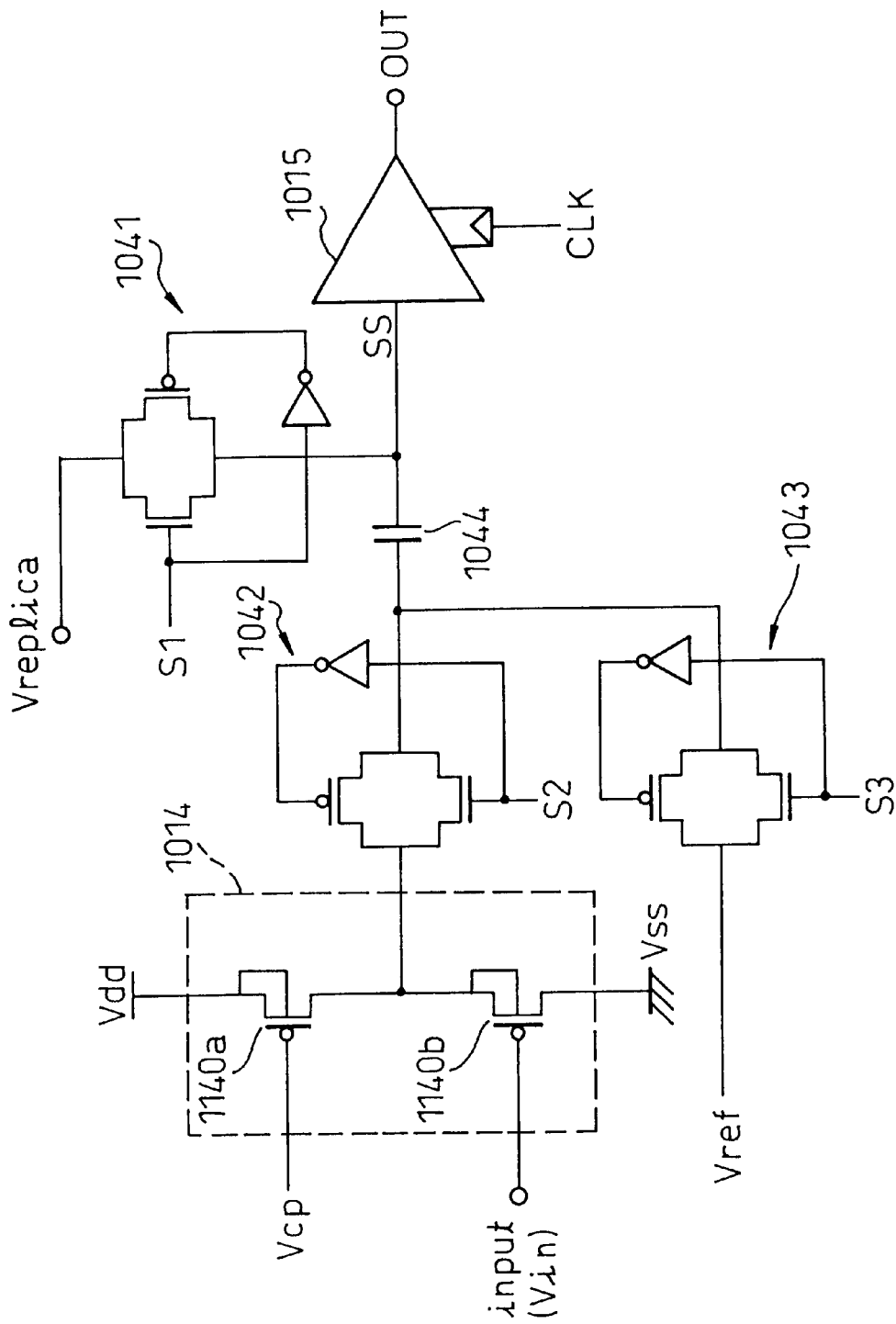
FIG. 4 is a circuit diagram showing a hybrid circuit for bidirectional signal transmission as a first embodiment of the first mode according to the present invention.

FIG. 4 is a circuit diagram showing a hybrid circuit for bidirectional signal transmission as a first embodiment of the first mode according to the present invention. In FIG. 4, reference numeral 1014 is a buffer circuit (source follower circuit as a voltage buffer circuit), 1015 is a decision circuit, 1041 to 1043 are switch circuits, and 1044 is a hold capacitor. The first embodiment shows a single-ended configuration, but the basic principle is the same for a differential configuration.

As shown in FIG. 4, the buffer circuit 1014 is configured as a source follower circuit in which a p-channel MOS transistor (pMOS transistor) 1140a, whose gate is supplied with a bias voltage Vcp, and a pMOS transistor 1140b, whose gate is supplied with an input (input signal Vin), are connected in series between power supply lines Vdd and Vss, and its output is supplied to the hold capacitor 1044 via the switch circuit 1042. The n-channel wells (n-wells) of the load device (1140a) and input device (1140b) are separated so that the voltage gain of the source follower circuit 1014 becomes nearly unity.

The switch circuits 1041, 1042, and 1043 are each constructed as a transfer gate switch consisting of a pMOS transistor, an nMOS transistor, and an inverter, each connected in parallel, and are used to apply the signal line voltage (Vin), replica driver output voltage (replica voltage) Vreplica, and reference voltage (Vref) to the respective electrodes of the hold capacitor 1044 in a controlled manner. The switch circuits 1041 to 1043 correspond to the switches 1141 to 1143, respectively, shown in FIG. 2A. The first embodiment differs from the prior art hybrid circuit 1104 shown in FIG. 2A by the inclusion of the source follower circuit 1014 to which the signal line voltage Vin (input) is supplied.

The operation of the hybrid circuit of the first embodiment will be described. First, prior to sampling, the switch circuits 1041 and 1042 are turned on (control signals S1 and S2 supplied to the respective switch circuits 1041 and 1042 are set to the high level "H") and the switch circuit 1043 is turned off (control signal S3 supplied to the switch circuit 1043 is set to the low level "L"). When sampling, the switch circuit 1041 is turned off (control signal S1 is set to the low level "L"). By so doing, the difference between the signal line voltage Vin and the replica voltage Vreplica, at that instant in time (sampling instant), is held in the hold capacitor 1044.

In the next decision period, the switch circuit 1042 is turned off (control signal S2 is set to the low level "L"), following which the switch circuit 1043 is turned on (control signal S3 is set to the high level "H") to apply the reference voltage Vref to one electrode of the hold capacitor 1044. As a result, a voltage equal to the sum of the reference voltage Vref and the difference between the signal line voltage vin and the replica voltage Vreplica is applied to the input SS (the other electrode of the hold capacitor 1044) of the decision circuit (decision comparator circuit) 1015. The received signal can be correctly identified by making a decision on this value in the decision circuit 1015.

Figure 5:
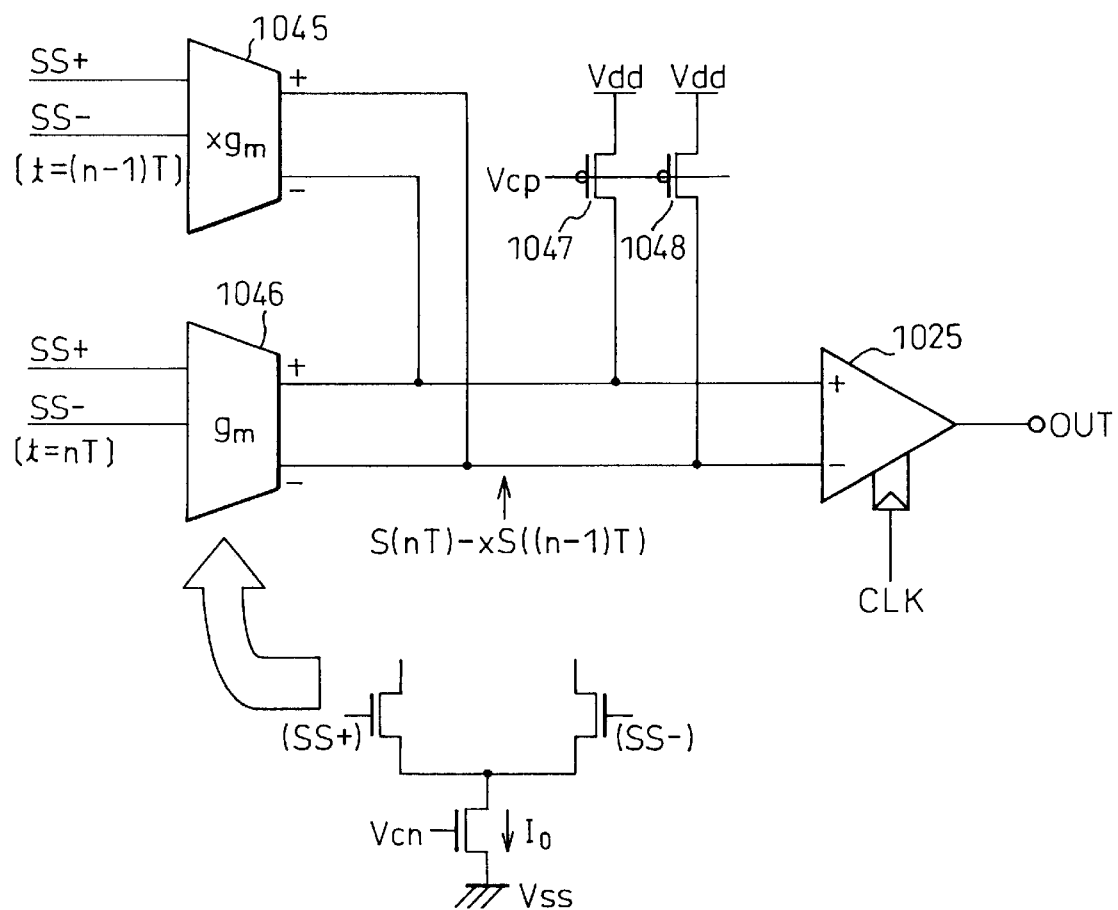
FIG. 5 is a circuit diagram showing a hybrid circuit for bidirectional signal transmission as a second embodiment of the first mode according to the present invention.

FIG. 5 is a circuit diagram showing a hybrid circuit for bidirectional signal transmission as a second embodiment of the first mode according to the present invention.

As shown in FIG. 5, in the second embodiment, transconductors 1045 and 1046 for performing voltage-to-current conversion and load devices 1047 and 1048 are placed before a decision comparator 1025 (corresponding, for example, to the decision circuit 5 in FIG. 3).

The transconductors 1045 and 1046 are each constructed using a conventional differential pair of nMOS transistors, and the load devices 1047 and 1048 are each constructed using a pMOS transistor biased to constant-current mode. The transconductors comprises main transconductor 1046 (t=nT) and sub-transconductor 1045 (t=(n−1)T) for equalizing, and by subtracting the present value multiplied by a coefficient (x) from the next bit time to obtain [S(nT)−xS((n−1)T)] and thus compensating for the intersymbol interference in the received signal (signals SS+ and SS− in FIG. 3) separated by the hybrid circuit, it becomes possible to enhance the accuracy of signal decision or to extend the signal transmission distance. Reference characters Vcp and Vcn designate bias voltages applied to the pMOS and nMOS transistors, respectively. The value of the coefficient x is adjusted by the tail current of the nMOS differential pair.

Figure 6:
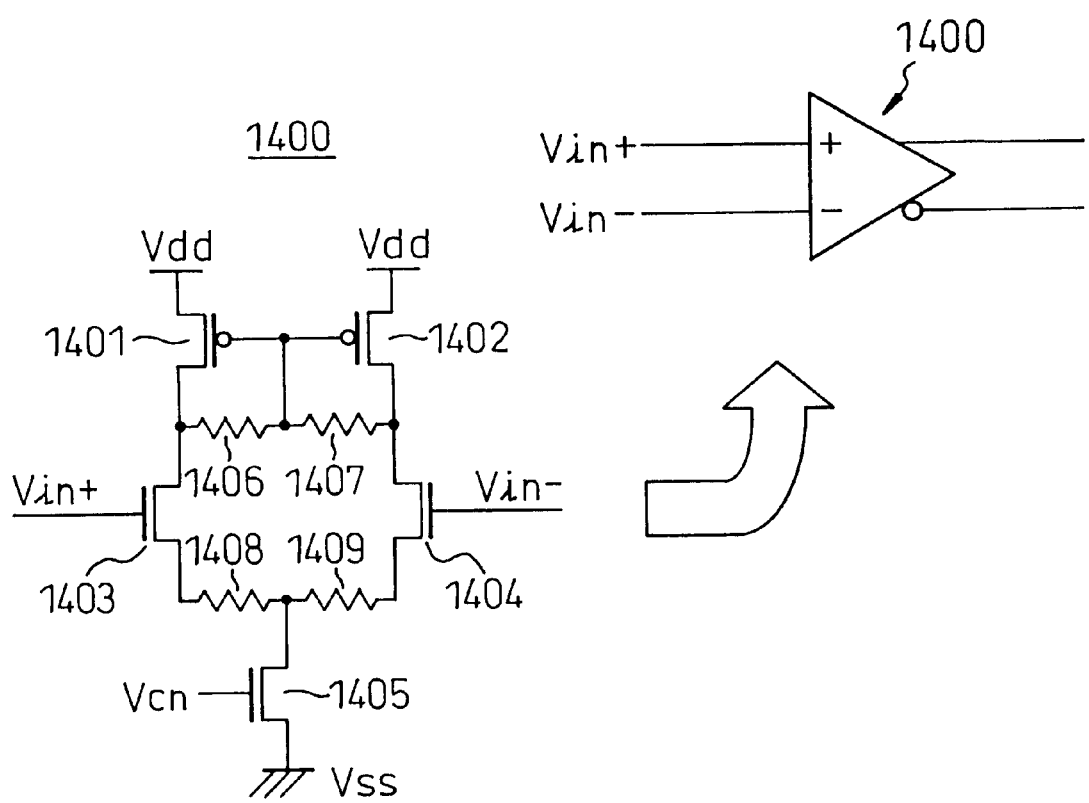
FIG. 6 is a circuit diagram showing a buffer circuit in a hybrid circuit for bidirectional signal transmission as a third embodiment of the first mode according to the present invention.

FIG. 6 is a circuit diagram showing a buffer circuit 1400 in a hybrid circuit for bidirectional signal transmission as a third embodiment of the first mode according to the present invention.

As shown in FIG. 6, the buffer circuit 1400 of the third embodiment comprises pMOS transistors 1401 and 1402, nMOS transistors 1403 to 1405, and polysilicon resistors 1406 to 1409, and is configured as a voltage buffer circuit using the polysilicon resistors 1408 and 1409 as the loads and the polysilicon resistors 1406 and 1407 for a source degeneration.

Here, the gain of the buffer circuit 1400 of the third embodiment is, for example, 3, and this gain value can be accurately determined by the resistance ratio of the polysilicon resistors. In the third embodiment, since the gain of the buffer circuit (1400) at the first stage is 3, the advantage is that the input offset of the decision circuit at the next stage (see the decision circuit 5 in FIG. 3) becomes correspondingly smaller, when referred to the input at the first stage. As for the buffer circuit at the first stage, since the impedance of the signal transmission line is as low as about 50 ohms, the size of the input devices, for example, can be made larger (by increasing the gate length and gate width of the transistors 1403 and 1404) and, as a result, the input offset can be made relatively small.

Figure 7:
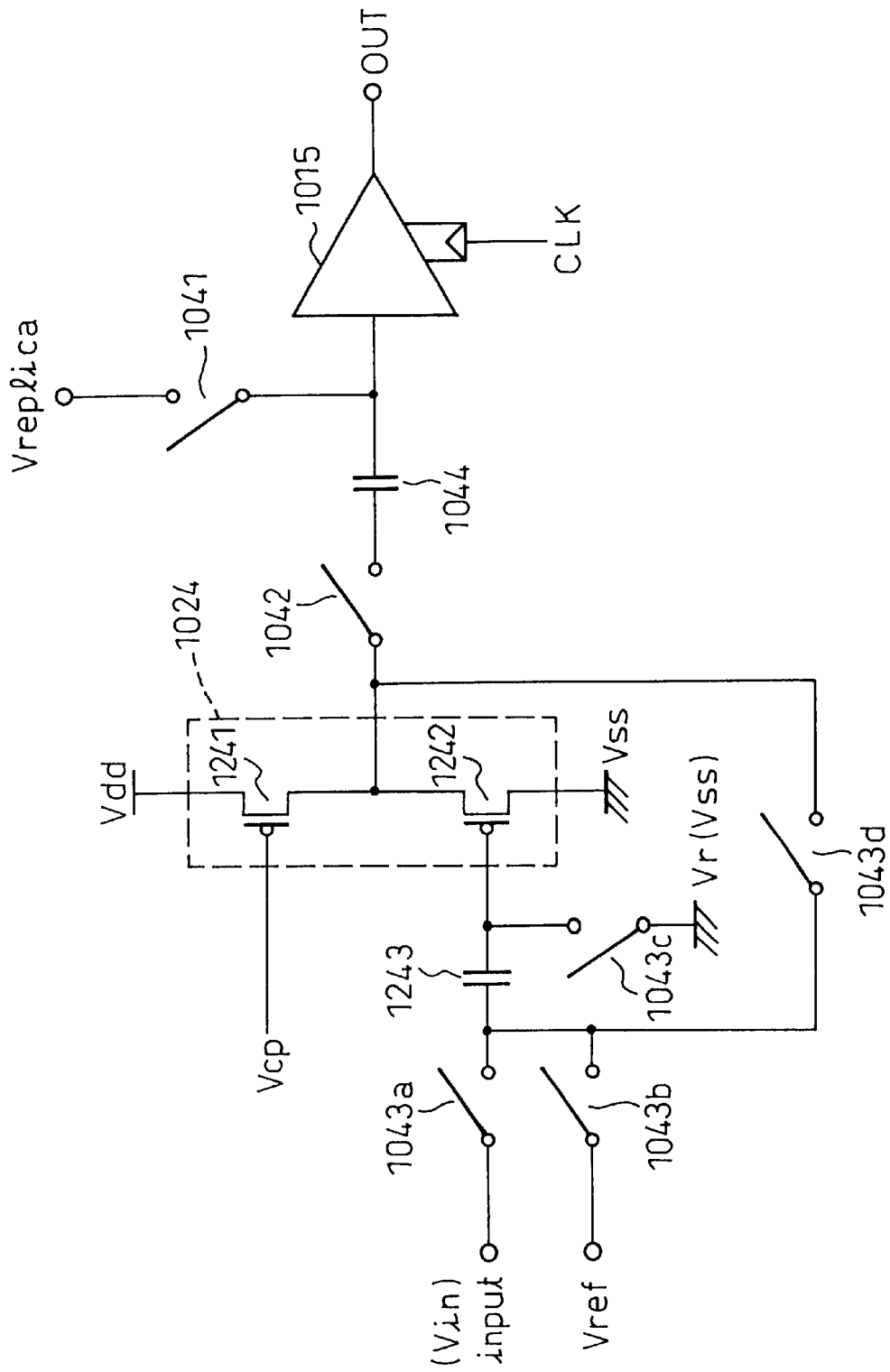
FIG. 7 is a circuit diagram showing a buffer circuit in a hybrid circuit for bidirectional signal transmission as a fourth embodiment of the first mode according to the present invention.

FIG. 7 is a circuit diagram showing a buffer circuit in a hybrid circuit for bidirectional signal transmission as a fourth embodiment of the first mode according to the present invention. The buffer circuit of the fourth embodiment is constructed as a source follower circuit (1024) having a voltage gain of unity, and a coupling capacitor (1243) is used at the input side to cancel the influence of the input offset.

In the non-operating period (reset period) of the buffer circuit (source follower circuit) 1024, the switches 1043c and 1043d are ON and the switches 1043a and 1043b are OFF, so that the input side of the coupling capacitor 1243 is disconnected from the input terminal and connected to the output of the buffer circuit 1024. At this time, the buffer circuit input terminal side (the gate of the transistor 1242) of the coupling capacitor 1243 is charged to the reference voltage Vr (for example, low supply voltage Vss). When the output voltage of the buffer circuit at this time is denoted Voff, the voltage applied to the coupling capacitor 1243 is Vr−Voff. Another voltage, not the low supply voltage Vss, for example, Vdd/2, may be used as the reference voltage Vr.

In the operating period of the buffer circuit, the switches 1043c and 1043d are OFF and the switch 43a is ON so that the capacitor 1243 is connected in series with the input (input signal Vin). Since the gain of the buffer circuit 1024 is almost unity, the offset voltage appearing at the output of the buffer circuit 1024 is canceled by the offset voltage accumulated in the capacitor 1243. Here, the bias voltage Vcp is applied to the gate of the transistor 1241. The switches 1041, 1042, and 1043b are switches for hybrid operation.

In this way, according to the fourth embodiment, though the voltage gain of the buffer circuit (source follower circuit) 1024 is as small as unity, the advantage is that the offset voltage of the buffer circuit as a whole becomes almost negligible because the offset voltage is canceled by the coupling capacitor 1243. Furthermore, though the coupling capacitor 1243 is used, since the load from the signal line input Vin (input) side is seen as the series connection of the coupling capacitor 1243 and source follower input capacitor 1044, the input capacitance is small enough so that the problem of kick-back noise, etc. does not occur.

Figure 8:
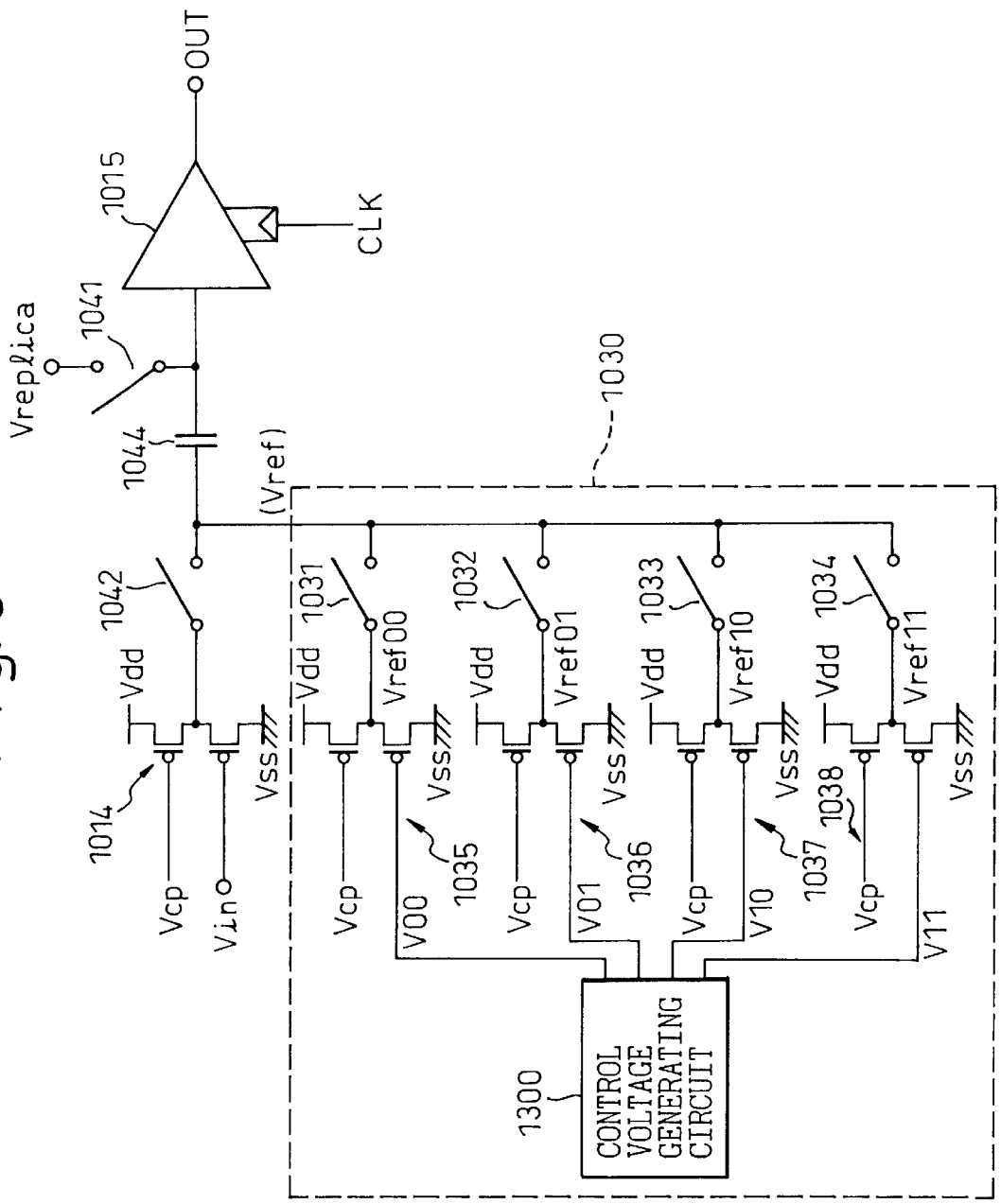
FIG. 8 is a circuit diagram showing a buffer circuit in a hybrid circuit for bidirectional signal transmission as a fifth embodiment of the first mode according to the present invention.

FIG. 8 is a circuit diagram showing a buffer circuit in a hybrid circuit for bidirectional signal transmission as a fifth embodiment of the first mode according to the present invention.

As is apparent from a comparison of FIGS. 4 and 8, the fifth embodiment comprises a reference voltage output circuit 1030 which outputs the reference voltage Vref described in the first embodiment. For the reference voltage Vref which is to be connected by the capacitive coupling hybrid circuit during the decision period, the reference voltage output circuit 1030 selects the reference voltage Vref00, Vref01, Vref10, or Vref11 for output, depending on whether the latest two bits of the signal sequence being sent out by the driver provided at the same side as the receiver is "00", "01", "10", or "11", respectively, and thus compensates for the difference between the output signal of the replica driver (1103 in FIG. 1) and the output signal of the driver (1102 in FIG. 1) actually outputting the signal.

More specifically, the reference voltage output circuit 1030 comprises: a control voltage generating circuit 1300 which generates a plurality of (for example, four) control voltages V00, V01, V10, and V11 in accordance with the data (for example, two bits) of the signal sequence being sent out by the driver; a plurality of reference voltage buffers 1035, 1036, 1037, and 1038 which receive the control voltages V00, V01, V10, and V11 and generate the reference voltages Vref00, Vref01, Vref10, and Vref11, respectively; and switches 1031, 1032, 1033, and 1034 used to select one of the plurality of reference voltage buffer outputs (Vref00, Vref01, Vref10, and Vref11) depending on the data of the signal sequence. The control voltage generating circuit 1300 can be constructed using, for example, a D/A converter. Further, the control voltages V00, V01, V10, and V11 that the control voltage generating circuit 1300 outputs can be automatically set, for example, after the receiver (apparatus) is powered on.

In this way, according to the fifth embodiment, a more accurate received signal can be separated for output by compensating for the difference between the signal from the replica driver and the contributing voltage from the driver that should be actually removed (the difference depends on the signal sequence being transmitted). In this case also, by coupling the reference voltage to the hold capacitor not directly but via the buffer circuit, good signal reception can be achieved that is free from mutual interference between receivers.

Figure 9:
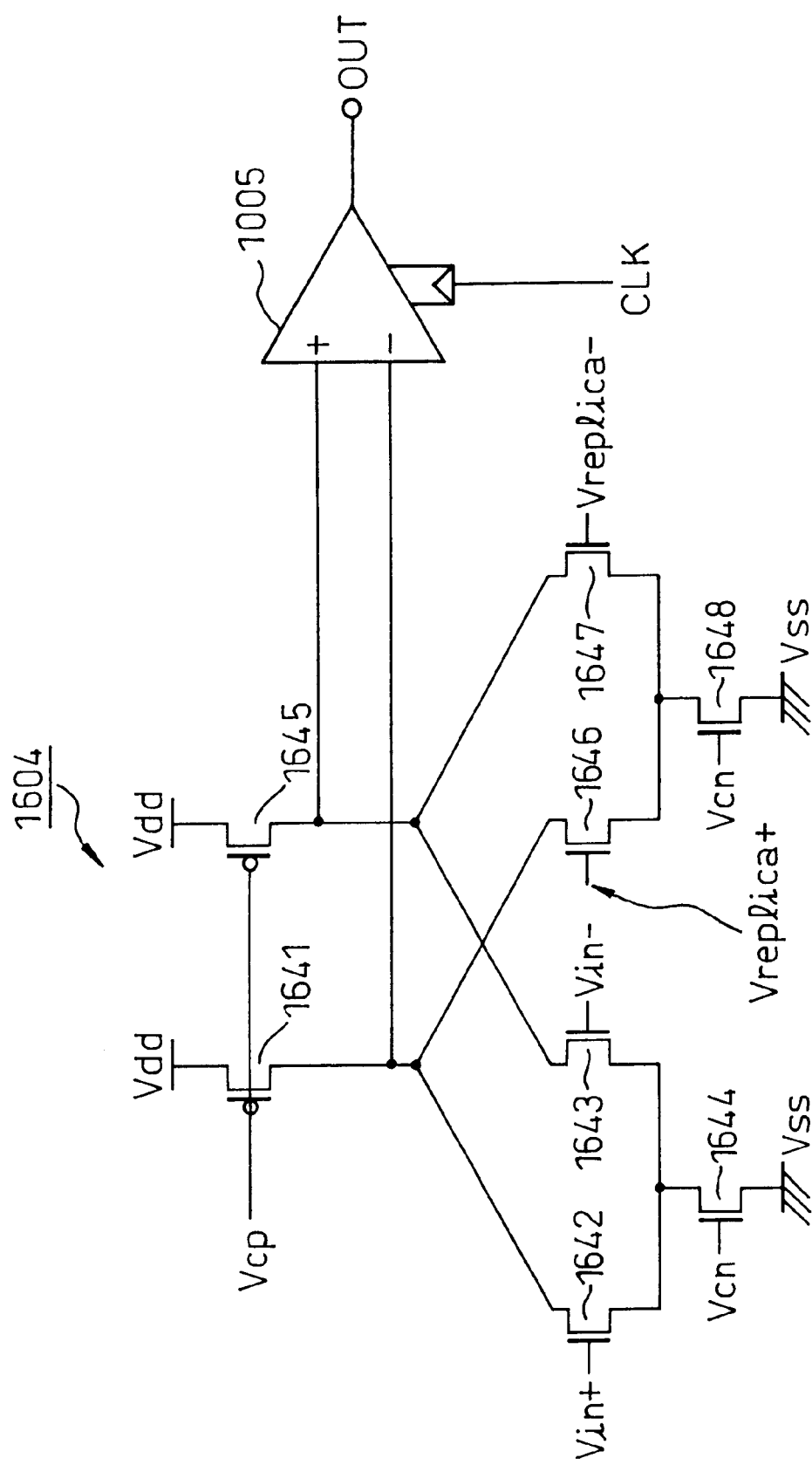
FIG. 9 is a circuit diagram showing a buffer circuit in a hybrid circuit for bidirectional signal transmission as a sixth embodiment of the first mode according to the present invention.

FIG. 9 is a circuit diagram showing a buffer circuit in a hybrid circuit for bidirectional signal transmission as a sixth embodiment of the first mode according to the present invention.

In the sixth embodiment, the hybrid circuit (buffer circuit) 1604 is constructed, not using a voltage output buffer but using transconductors for performing voltage-to-current conversion.

More specifically, as shown in FIG. 9, the transconductors are constructed using nMOS differential pairs (transistors 1642, 1643 and 1646, 1647), and the currents from the transconductor (transistors 1642 and 1643) driven by differential (complementary) input signals Vin+ and Vin− and the transconductor (transistors 1646 and 1647) driven by differential replica voltages (replica driver outputs) Vreplica+ and Vreplica− are coupled to a pair of pMOS loads 1641 and 1645, thereby subtracting one current from the other to accomplish hybrid circuit operation. The voltage Vcp is the voltage for biasing the pMOS transistors 1641 and 1645, while the voltage Vcn is the voltage for biasing nMOS transistors 1644 and 1648.

In this way, according to the sixth embodiment, since there is no need to charge and discharge a capacitor, the advantage is that the kick-back noise is very small.

Figure 10:
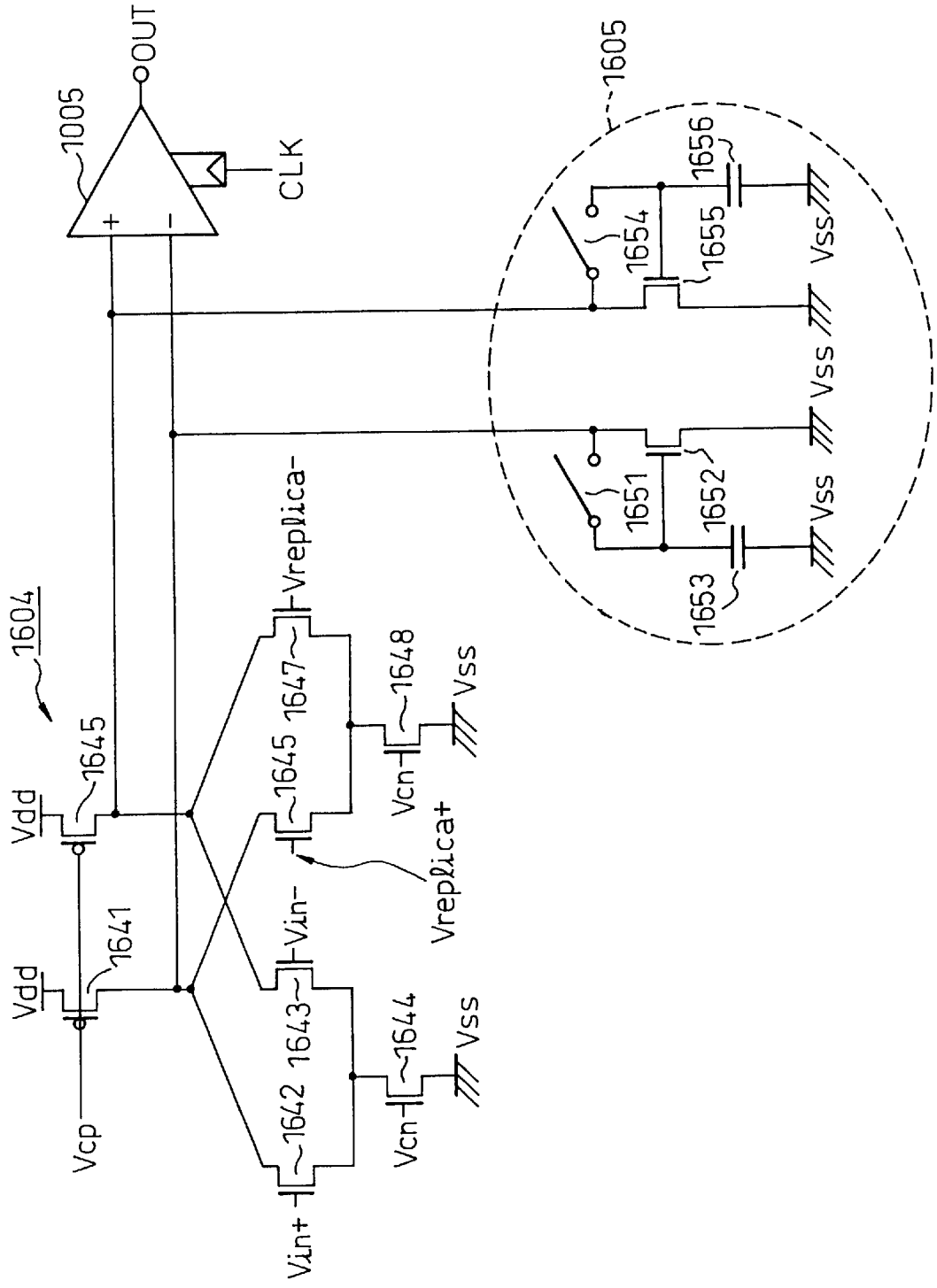
FIG. 10 is a circuit diagram showing a buffer circuit in a hybrid circuit for bidirectional signal transmission as a seventh embodiment of the first mode according to the present invention.

FIG. 10 is a circuit diagram showing a buffer circuit in a hybrid circuit for bidirectional signal transmission as a seventh embodiment of the first mode according to the present invention.

The seventh embodiment also uses the transconductors as the hybrid circuit (buffer circuit) 1604, as in the foregoing sixth embodiment, but differs by the inclusion of an offset compensating circuit 1605 which is connected in parallel of the load devices to compensate for the input offset.

As shown in FIG. 10, the offset compensating circuit 1605 comprises switches 1651 and 1654, nMOS transistors 1652 and 1655, and hold capacitors 1653 and 1656.

During the non-operating period of the buffer circuit, all inputs (Vin+, Vin−, Vreplica+, and Vreplica−) are connected, for example, to the reference voltage (for example, high supply voltage Vdd), and the output current (corresponding to the offset) of the buffer circuit at this time is allowed to flow into the offset compensating circuit 1605. At this time, the switches 1651 and 1654 are ON so that the gate voltages (source-gate voltages) of the transistors 1652 and 1655 are accumulated in the hold capacitors 1653 and 1656, respectively.

When making a decision on the received signal in the decision circuit 1005, the switches 1651 and 1654 are turned off to cut off the gate-drain connections of the transistors 1652 and 1655. This causes the gate voltages held in the hold capacitors 1653 and 1656 to be supplied to the respective transistors 1652 and 1655, and the current output from the offset compensating circuit 1605 is therefore equal to the offset current during the non-operating period of the buffer circuit. As a result, the offset current is subtracted from the load devices, thus compensating for the transconductor offset.

In the seventh embodiment, since the offset of the buffer circuit can be compensated for without being affected by the kick-back noise to the input side, more accurate signal reception becomes possible.

Figure 11:
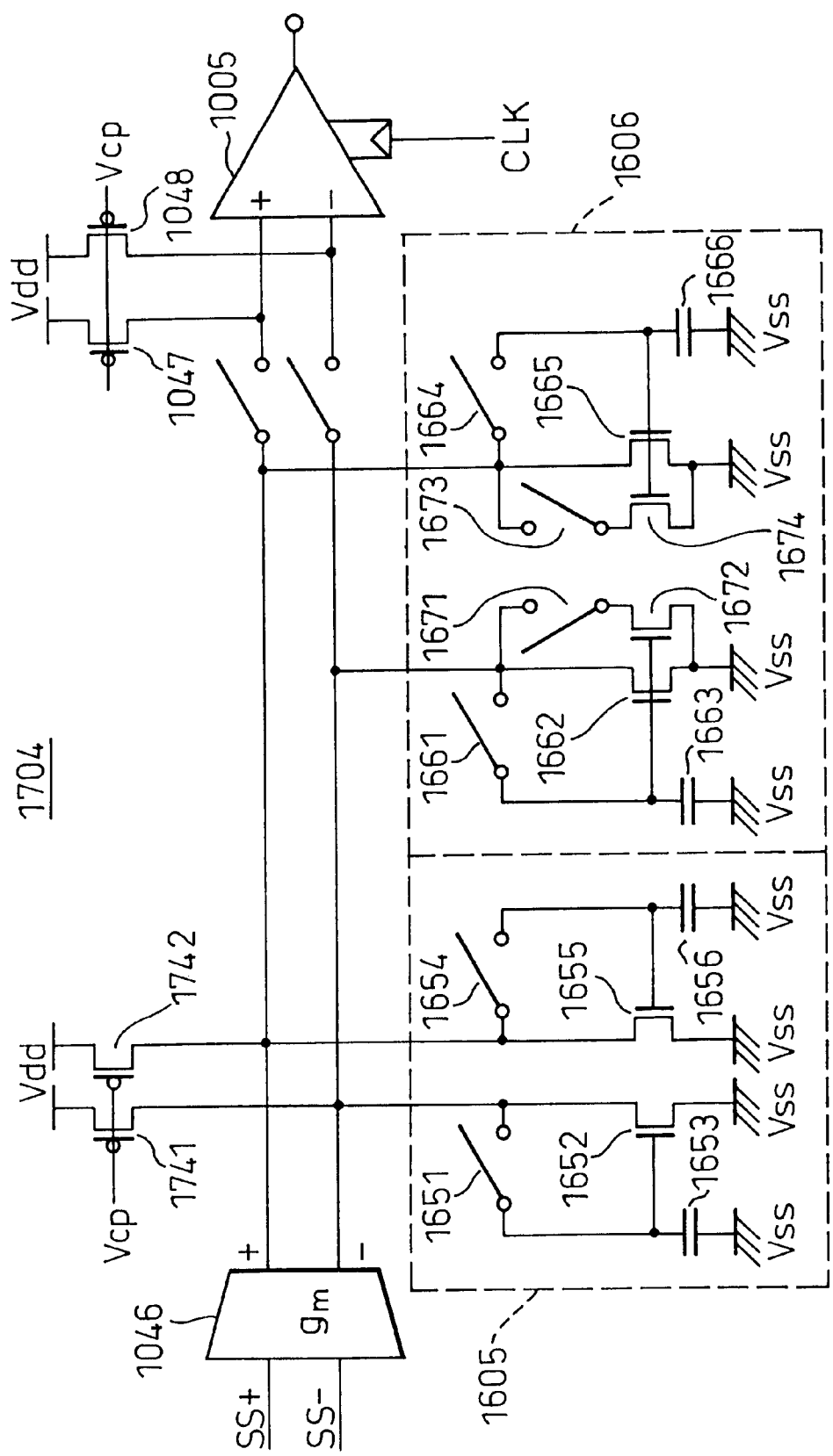
FIG. 11 is a circuit diagram showing a hybrid circuit for bidirectional signal transmission as an eighth embodiment of the first mode according to the present invention.

FIG. 11 is a circuit diagram showing a hybrid circuit for bidirectional signal transmission as an eighth embodiment of the first mode according to the present invention.

As shown in FIG. 11, in the eighth embodiment, the output currents of the transconductor 1046 are introduced through a so-called cascode connection into the pMOS load devices 1741 and 1742 and, using a folded structure, connected to a hold circuit 1606 which is constructed using nMOS devices. The offset compensating circuit 1605 here is the same as that used in the seventh embodiment, and the description thereof will not be repeated here.

The hold circuit 1606 comprises switches 1661 and 1664, transistors 1662 and 1665, and capacitors 1663 and 1666, similar to those in the offset compensating circuit 1605. The hold circuit 1606 further includes a switch 1671 and transistor 1672 connected between the source and drain of the transistor 1662, and a switch 1673 and transistor 1674 connected between the source and drain of the transistor 1666.

First, all the switches 1661, 1664, 1671, and 1673 in the hold circuit 1606 are turned on in the sampling period, and turned off at the instant that the sampling ends. By so doing, the current values at the end of the sampling of the previous bit time t=(n−1)T are held in the respective capacitors 1663 and 1666. The current values taken at the end of the sampling are then coupled to the pMOS load devices (transistors 1741 and 1742), and are used to create the signal voltage on which the decision circuit 1005 makes a decision during the decision period.

Then, all the switches 1661, 1664, 1671, and 1673 in the hold circuit 1606 are turned off, and equalization is performed by subtracting the signal value ((n−1)T) of the previous bit time t=(n−1)T, multiplied by a coefficient, from the signal value of the next bit time t=nT. That is, the received signal can be equalized by determining the value of the coefficient by adjusting the size of the transistors 1662 and 1665 and the size of the transistors 1672 and 1674 in the hold circuit 1606.

In this way, in the eighth embodiment, since offset compensation and received signal equalization can be performed using the transconductor-type buffer circuit with reduced kick-back noise, good signal reception with reduced offset and reduced intersymbol interference becomes possible.

Figure 12:
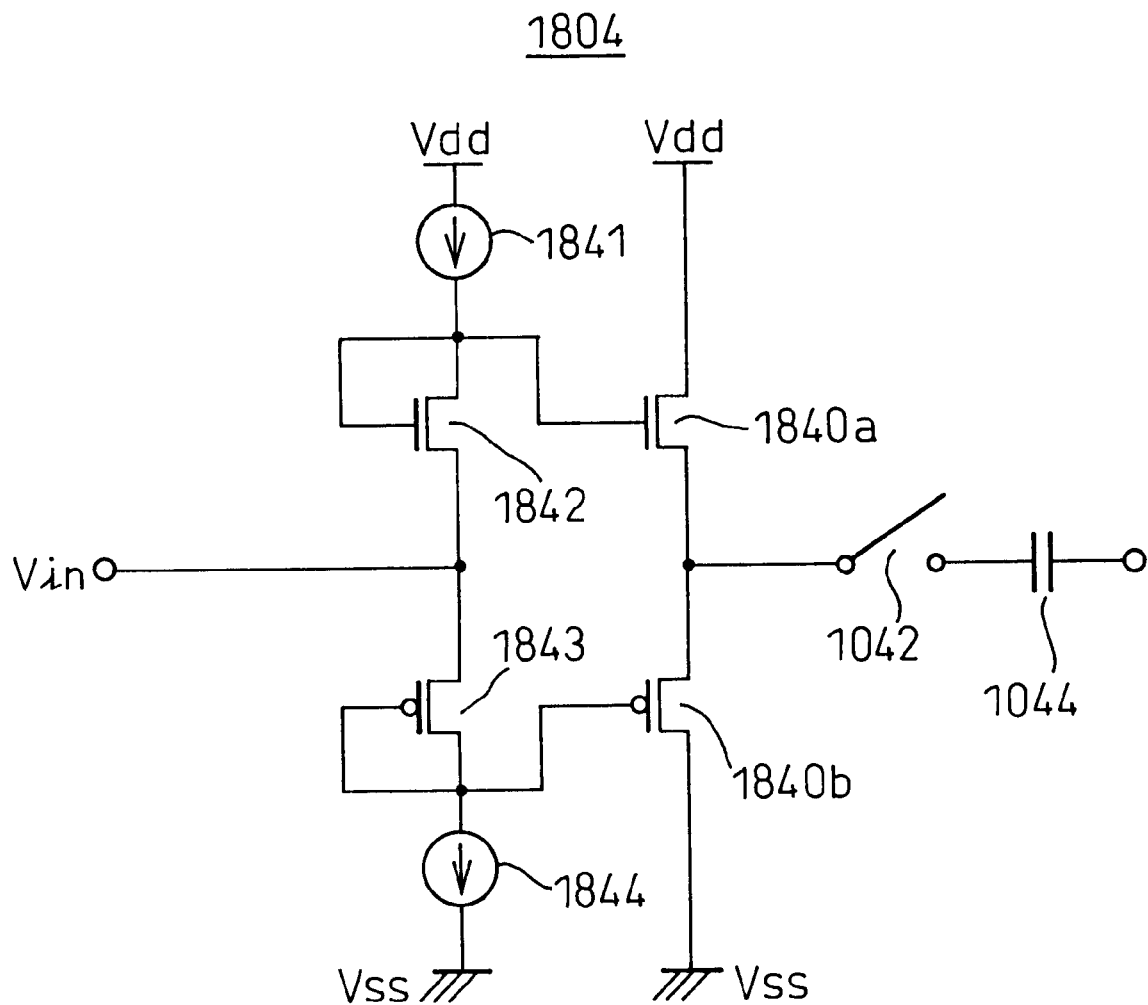
FIG. 12 is a circuit diagram showing a buffer circuit in a hybrid circuit for bidirectional signal transmission as a ninth embodiment of the first mode according to the present invention.

FIG. 12 is a circuit diagram showing a buffer circuit in a hybrid circuit for bidirectional signal transmission as a ninth embodiment of the first mode according to the present invention. In FIG. 12, reference numerals 1841 and 1844 are current sources, 1842 and 1840a are nMOS transistors, and 1843 and 1840b are pMOS transistors.

In the ninth embodiment, the buffer circuit employs a push-pull output configuration consisting of the nMOS transistor 1840a and pMOS transistor 1840b. Generally, a push-pull source follower output stage is not widely used because the output amplitude is limited, but using it at the input stage, as in this embodiment, does not present any problem.

In this way, the ninth embodiment, because of its push-pull configuration, has the advantage of high speed operation since, unlike the case of conventional source followers, slew rate limitations due to charge/discharge by constant current biasing do not occur.

As described above, according to each embodiment of the first mode of the present invention, a hybrid circuit used for bidirectional transmission capable of efficiently utilizing the bandwidth of a signal transmission line can be realized without entailing the problem of kick-back noise. That is, a receiver and hybrid circuit for bidirectional transmission can be provided that resolve the problem of the kick-back noise that a capacitive coupling hybrid circuit has on its input side.

Next, before proceeding to a detailed description of the preferred embodiments of a driver circuit and a signal transmission system according to second and third modes of the present invention, a driver circuit and a signal transmission system according to the prior art and the problem associated with the prior art will be described with reference to drawings.

Figure 13B:
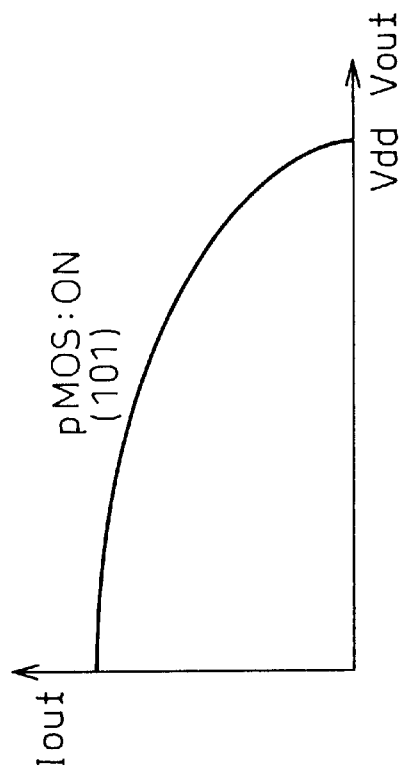
FIGS. 13A, 13B, and 13C are diagrams for explaining one example of a prior art driver circuit.
Figure 13C:
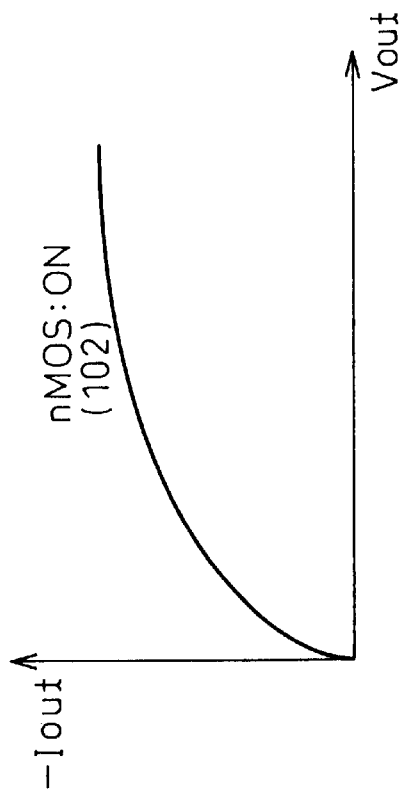
Figure 13A:
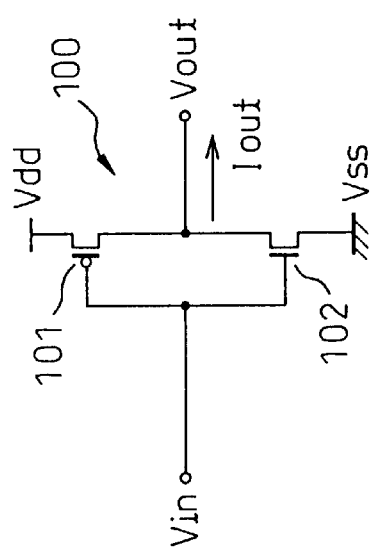

FIGS. 13A, 13B, and 13C are diagrams for explaining one example of the prior art driver circuit: FIG. 13A shows an inverter as one example of the driver circuit, FIG. 13B shows the characteristic when a p-channel MOS (pMOS) transistor is ON, and FIG. 13C shows the characteristic when an n-channel MOS (nMOS) transistor is ON. In FIG. 13A, reference numeral 100 designates the driver circuit (CMOS inverter), 101 the pMOS transistor, and 102 the nMOS transistor.

For the prior art signal driver (driver circuit 100), the push-pull inverter type shown, for example, in FIG. 13A is widely used. The impedance of this inverter type driver circuit 100 increases with increasing drain-source source voltage of the output transistors 101 and 102, because the I-V characteristics of the transistors are saturation characteristics.

That is, as shown in FIGS. 13B and 13C, the currents (Iout and −Iout) flowing through the output transistors 101 and 102 change nonlinearly as a function of the terminal voltage (Vout), exhibiting characteristics displaced from the ideal straight line by several tens of percent.

Accordingly, if bidirectional transmission is performed using this driver circuit 100, errors equivalent, for example, to several tens of percent of the transmitting output may occur due to impedance nonlinearity, and when the received signal has decayed, there can occur a situation where the received signal can hardly be discriminated.

Hereinafter, embodiments of a driver circuit and a signal transmission system according to the second and third modes of the present invention will be described with reference to accompanying drawings.

Figures 14A, 14B, 14C, 14D:
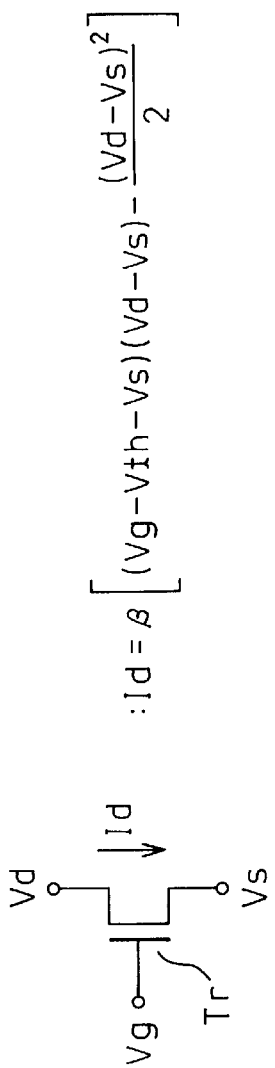
FIGS. 14A, 14B, 14C, and 14D are diagrams showing the basic functional configuration of a driver circuit according to a second mode of the present invention.

FIGS. 14A, 14B, 14C, and 14D are diagrams showing the basic functional configuration of the driver circuit according to the second mode of the present invention. FIG. 14A shows the current (drain current) Id that flows through a transistor Tr when the drain voltage is denoted by Vd, the source voltage by Vs, and the gate voltage by Vg; FIG. 14B shows the current I1 that flows through a transistor Tr1 when the source voltage Vs is set at V0 and the gate voltage Vg is held constant; and FIG. 14C shows the current I2 that flows through a transistor Tr2 when the source voltage Vs is set at V0 and the gate voltage Vg is set at a voltage shifted from the drain voltage Vd by a predetermined voltage (Vth) through a shifter SFT. FIG. 14D shows the current I1 of FIG. 14B, the current I2 of FIG. 14C, and the sum of these currents I1 and I2 (I1+I2).

The driver circuit according to the second mode of the present invention is constructed to produce an output impedance of high linearity by connecting the first transistor Tr1 and second transistor Tr2 in parallel so that the saturation characteristic of the first transistor Tr1 is canceled by the current flowing through the second transistor Tr2.

Here, an analysis will be given below when the first and second transistors Tr1 and Tr2 are equal in characteristic and have the square-law characteristic shown below. The following description is given by dealing with pull-down devices using nMOS transistors, but the same analysis applies for pull-up devices using pMOS transistors.

First, the transistor characteristic is given by $$Id=\beta[(Vg-Vth-Vs)\cdot(Vd-Vs)-(Vd-Vs)^2/2]$$

where reference characters Vd, Vs, and Vg denote the drain voltage, source voltage, and gate voltage, respectively, and Vth designates the threshold voltage. Because of the pull-down configuration, the source voltage Vs is at 0 volt (Vs=0).

When the gate voltage Vg of the transistor is constant (Vg=const), the conductance Gd of the drain is given by $\delta I/\delta Vd$, and hence $$Gd=\beta[Vg-Vth-Vd]$$

Reflecting the fact that the current-voltage characteristic is upwardly convex, the conductance Gd decreases with Vd.

Next, when the transistor gate voltage Vg=Vth+Vd, that is, when the gate voltage is varied as a function of the output voltage Vd of the driver circuit, then by substituting Vg=Vth+Vd into the equation of the current and differentiating it with Vd, the conductance of the drain is given by $$Gd'=\beta[Vg-Vs]=\beta Vd$$

That is, since the current-voltage characteristic is downwardly convex, the conductance increases with the output voltage Vd of the driver circuit.

Accordingly, when these two transistors are connected in parallel, the total conductance is the sum of Gd and Gd', and is given by $$Gd+Gd'=\beta[Vg-Vth]$$

where Vg is the gate voltage of the gate voltage constant device.

As described above, by connecting the two transistors (first and second transistors) in parallel, the dependence of the conductance on the drain voltage Vd (signal voltage: the output voltage of the driver circuit) can be eliminated.

According to the present invention, the saturation characteristic of one transistor can be compensated for by the downward convex current-voltage characteristic of another device connected in parallel, and an internal impedance having excellent linearity with respect to the voltage can be achieved. That is, internal impedance having excellent linearity can be achieved by compensating for the nonlinearity in the current-voltage characteristic of the transistor, and a driver circuit whose output impedance is relatively independent of voltage can be realized by using this internal impedance as the load device for the driver circuit.

Figure 15:
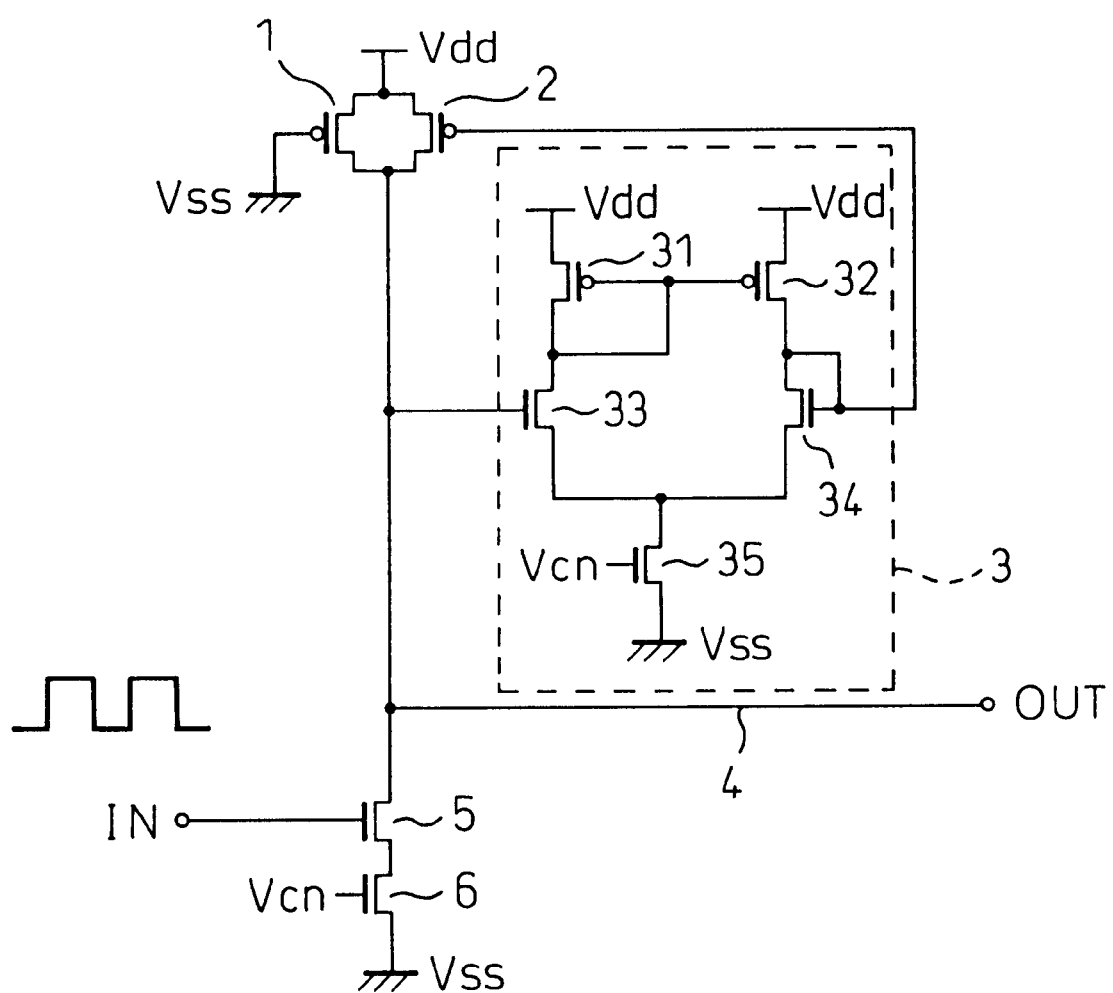
FIG. 15 is a circuit diagram showing a first embodiment of the driver circuit according to the present invention.

FIG. 15 is a circuit diagram showing a first embodiment of the driver circuit according to the present invention. In FIG. 15, reference numerals 1 and 2 are pMOS transistors, 3 is a gate voltage generating circuit (voltage shift circuit), 4 is an output signal line, and 5 and 6 are nMOS transistors.

As shown in FIG. 15, in the driver circuit of the first embodiment, the first transistor 1 has its source connected to a high voltage supply line Vdd, its drain connected to the output signal line 4, and its gate connected to a low voltage supply line Vss. The second transistor 2 is connected in parallel with the first transistor 1, and the output of the gate voltage generating circuit 3 is applied to the gate of the second transistor 2. The drains of the transistors 1 and 2 are coupled together, and are connected to the output signal line 4 as well as to the drain of the transistor 5 whose source is connected to the low voltage supply line Vss via the transistor 6 whose gate is supplied with a bias voltage Vcn. Here, the gate of the transistor 5 is supplied with an input signal (IN).

The gate voltage generating circuit 3, which controls the gate voltage of the transistor 2, comprises pMOS transistors 31 and 32 and nMOS transistors 33, 34, and 35, and applies the voltage of the output signal line 4, after shifting it, to the gate of the transistor 2.

More specifically, in the driver circuit of the first embodiment, the gate voltage generating circuit 3 takes the voltage of the signal line 4 into a unity gain buffer, and drives the gate of the transistor 2 by its output voltage. In the first embodiment, the current supplied from the constant-current driver constructed with the nMOS transistors 5 and 6 is applied to the pMOS devices (transistors 1 and 2) to generate an output voltage. Here, since the gate voltage of the transistor 2 varies with the signal voltage, the current-voltage characteristic of the transistor 2 is represented by a downward convex curve so as to compensate for the saturation characteristic of the transistor 1; as a result, the voltage dependence of the impedance of the load devices (the paralleled transistors 1 and 2) decreases, and the impedance shows a good linearity.

Figure 16:
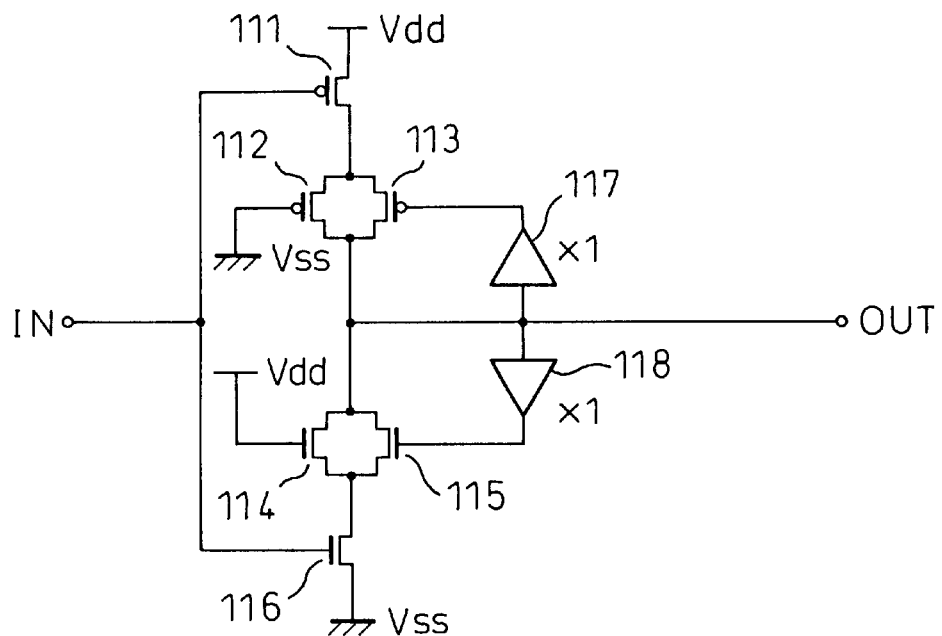
FIG. 16 is a circuit diagram showing a second embodiment of the driver circuit according to the present invention.

FIG. 16 is a circuit diagram showing a second embodiment of the driver circuit according to the present invention.

The second embodiment differs from the foregoing first embodiment in that load device pairs 112, 113 and 114, 115 are connected in series to a voltage mode driver, not to a constant-current driver. Reference numerals 117 and 118 each designate a unity gain buffer (gate voltage generating circuit).

As shown in FIG. 16, the load devices consist of the pMOS transistors 112 and 113 and nMOS transistors 114 and 115, and a voltage dependent on the signal line voltage (OUT) is applied to the gate of each of the transistors 113 and 115.

In the second embodiment, the signal line voltage (IN) is applied directly to the gate of each of the transistors 111 and 116, and when the pMOS transistor 111 is ON, the nMOS transistor 116 is OFF, and all the load current flowing through the pull-up load device (transistors 112 and 113) is taken as a signal current outside the driver circuit; conversely, when the pMOS transistor 111 is OFF, the nMOS transistor 116 is ON, and all the load current flowing through the pull-down load device (transistors 114 and 115) is taken as a signal current outside the driver circuit (all the signal current flows through the pull-down load device). As a result, the current consumption can be reduced (by half) compared with the first embodiment.

Figure 17:
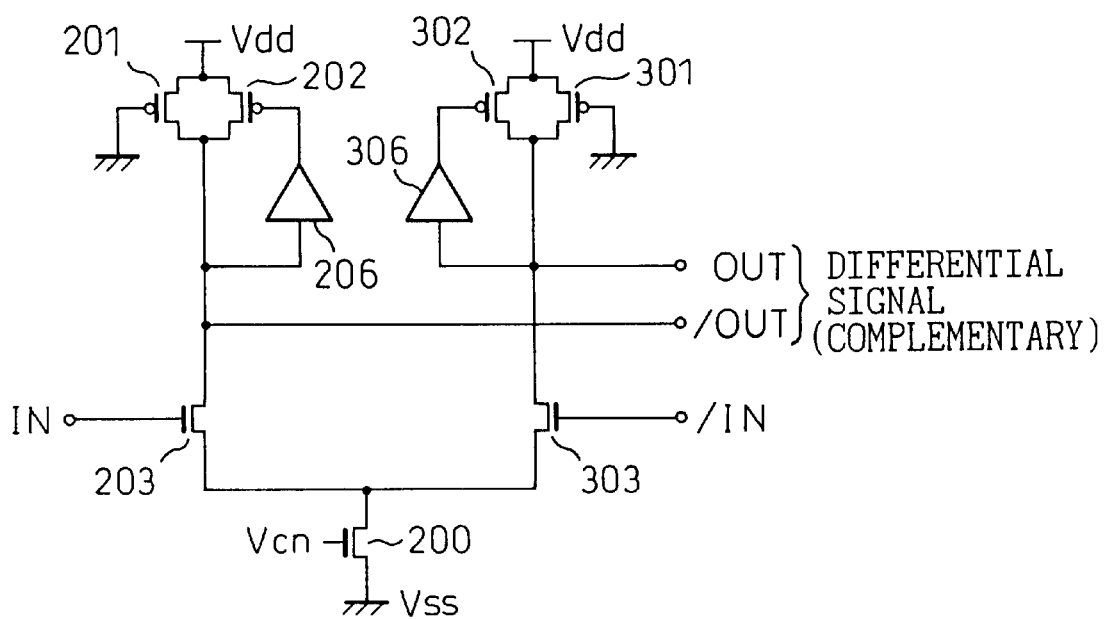
FIG. 17 is a circuit diagram showing a third embodiment of the driver circuit according to the present invention.

FIG. 17 is a circuit diagram showing a third embodiment of the driver circuit according to the present invention. In FIG. 17, reference numerals 201, 202, 301, and 302 are load devices constructed from pMOS transistors, 203 and 303 are nMOS differential-pair transistors, 200 is a current limiting transistor (nMOS bias transistor), and 206 and 306 are buffers (gate voltage generating circuits).

As shown in FIG. 17, in the third embodiment, the current driver is constructed as an nMOS differential pair, and its output current is applied to the pMOS load devices 201, 202, 301, and 302. Since the drain voltage of the current limiting transistor 200 for generating a constant current as a constant-current driver is held substantially constant, the third embodiment offers the advantages that switching time improves, and that the common-mode input voltage rejection characteristic improves, increasing the resistance to noise.

Figure 18:
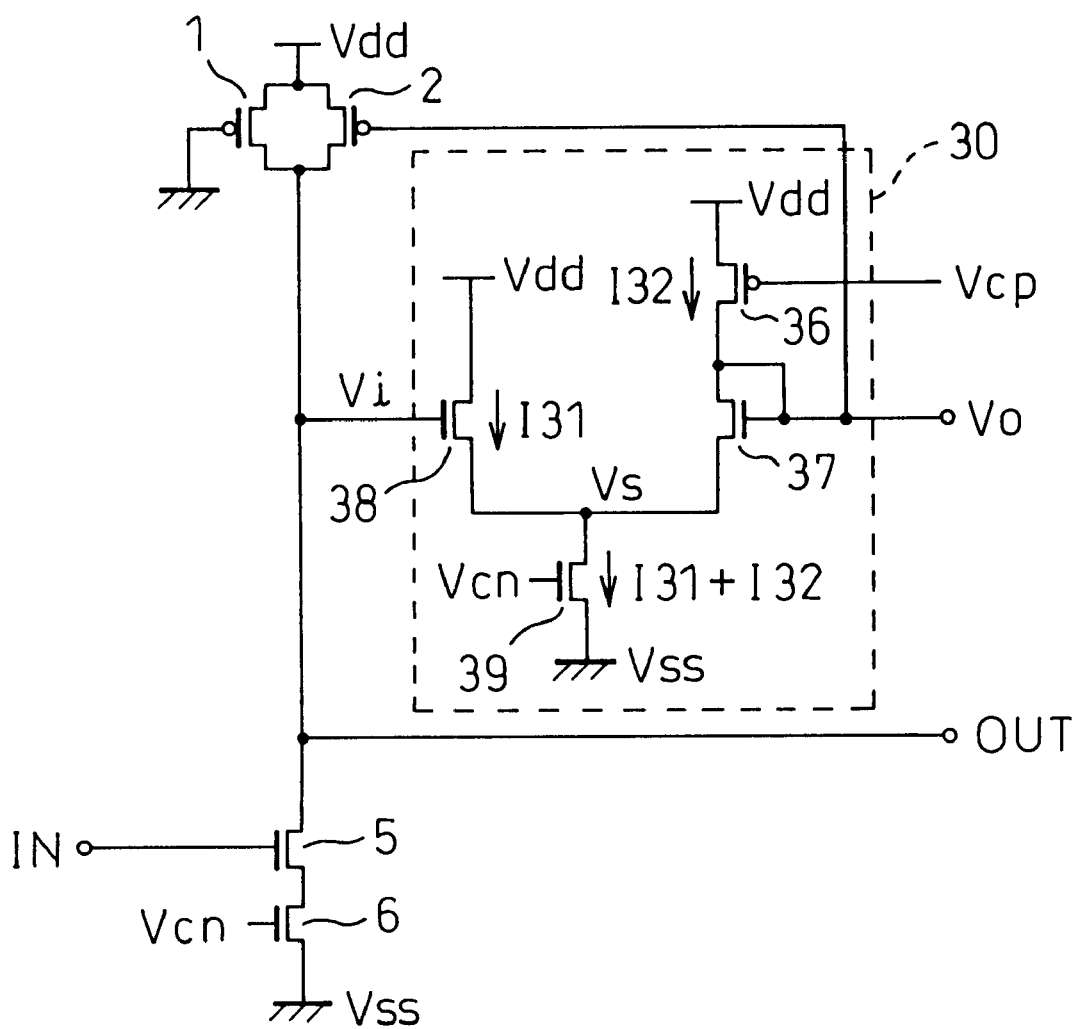
FIG. 18 is a circuit diagram showing a fourth embodiment of the driver circuit according to the present invention.

FIG. 18 is a circuit diagram showing a fourth embodiment of the driver circuit according to the present invention.

The general configuration of the fourth embodiment is the same as that of the first embodiment shown in FIG. 15, the only difference being in the configuration of the gate voltage generating circuit (voltage shift circuit) 30. That is, the gate voltage generating circuit 30 in the fourth embodiment is not just a unity gain buffer, but is configured to output a voltage (Vo) by shifting its input voltage (Vi) by a given amount.

The gate voltage generating circuit 30 is implemented as a voltage shift circuit with an nMOS transistor pair 37, 38 at its input, and the amount of voltage shift is chosen to be equal to the threshold voltage (Vth) of the pMOS transistor 36. Here, the gates of the pMOS transistor 36 and nMOS transistor 39 are supplied with bias voltages Vcp and Vcn, respectively.

More specifically, when the current flowing through the transistor 38 is denoted by I31, and the current flowing through the transistor 36 (37) by I32, then the current of I31+I32 flows through the transistor 39. When the voltage at the connecting node between the transistors 37, 38 and the transistor 39 is denoted by Vs, the currents I31 and I32 are respectively given by $I31=\beta(Vi-Vs-Vth)^2$ and $I32=\beta(Vo-Vs-Vth)^2$, from which $Vi=(I31/\beta)^{1/2}+Vs+Vth$ and $Vo=(I32/\beta)^{1/2}+Vs+Vth$. Hence, $Vi-Vo=(I31/\beta)^{1/2}-(I32/\beta)^{1/2}$. By choosing the amount of voltage shift in this way, the impedance linearity of the load devices (the paralleled transistors 1 and 2) can be further improved.

Figure 19:
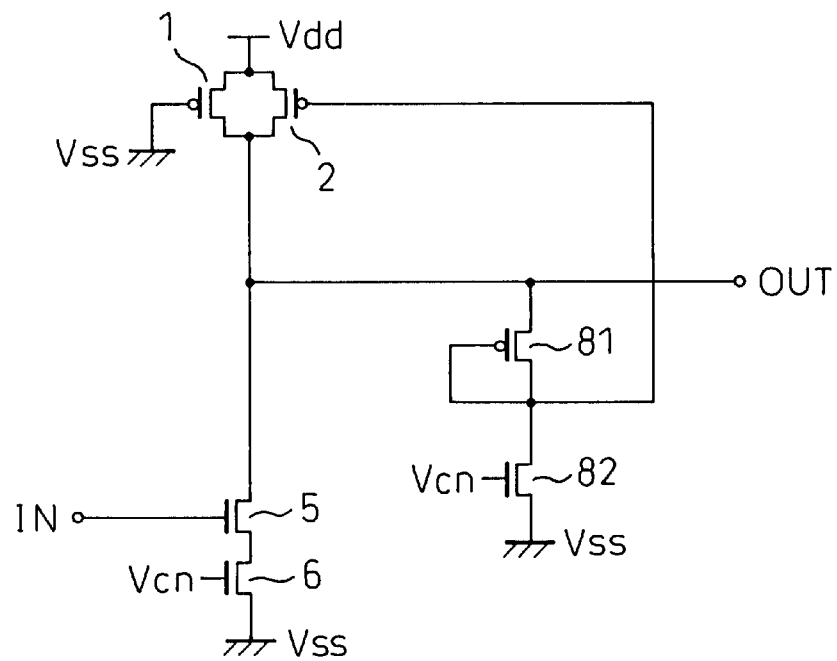
FIG. 19 is a circuit diagram showing a fifth embodiment of the driver circuit according to the present invention.

FIG. 19 is a circuit diagram showing a fifth embodiment of the driver circuit according to the present invention.

As shown in FIG. 19, in the fifth embodiment, the gate voltage generating circuit comprises a diode-connected pMOS transistor 81 and a constant-current source 82 for supplying a current to it. Accordingly, in the fifth embodiment, since the amount of voltage shift generated is equal to the threshold voltage of the pMOS transistor 81 and coincides with the threshold voltage of the load device (pMOS transistors 1 and 2), if the transistor threshold voltage varies due to process variation, a voltage (the gate voltage of the transistor 2) for compensating for the variation is generated. This offers the advantage that the linearity of the load devices is unaffected by variations in the semiconductor fabrication process.

Figure 20:
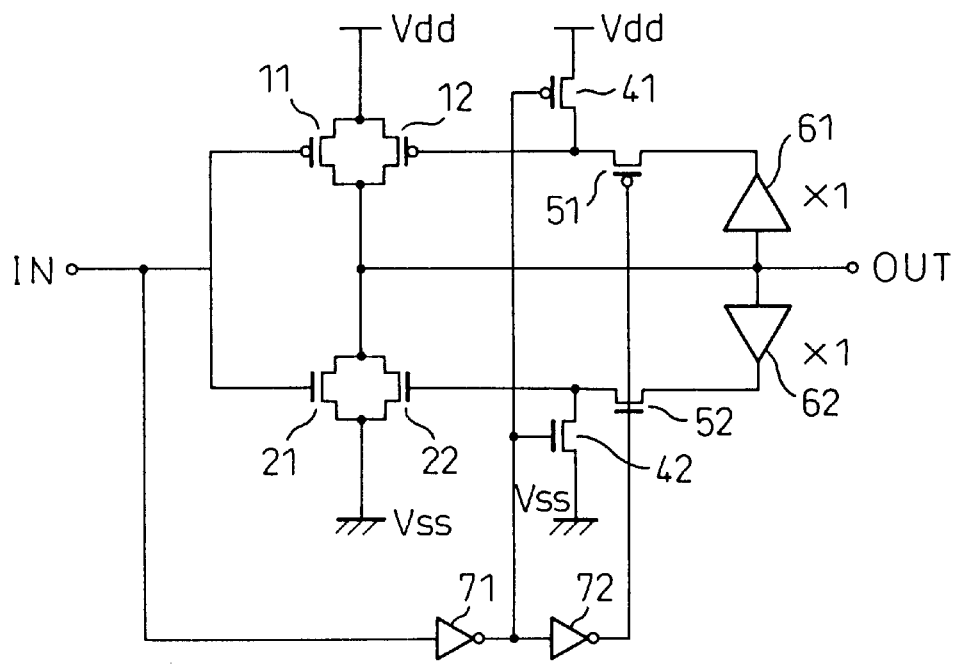
FIG. 20 is a circuit diagram showing a sixth embodiment of the driver circuit according to the present invention.

FIG. 20 is a circuit diagram showing a sixth embodiment of the driver circuit according to the present invention.

As shown in FIG. 20, the sixth embodiment comprises a pull-up load device (pMOS transistors 11 and 12) and a pull-down load device (nMOS transistors 21 and 22), as in the second embodiment shown in FIG. 16, and a voltage dependent on the signal line voltage (OUT) is applied to the gate of each of the transistors 12 and 22. The transistors 11 and 21 are driven directly from the front stage by applying an input signal to their gates, but since the gate voltages of the transistors 12 and 22 must be varied depending on the signal voltage when the respective load devices are ON, switching transistors (51 and 52) are inserted between the gates and the gate voltage generating circuits (61 and 62).

When the input signal (IN) is low "L", the pull-up load 11 is ON and the pull-down load 21 is OFF; at this time, a pull-up transistor 41 supplied with a high "H" voltage via an inverter 71 is OFF and a pull-down transistor 42 supplied with the same voltage is OFF. Further, the gate transistor 51 supplied with a low "L" voltage via the inverters 71 and 72 is ON and the gate transistor 52 supplied with the same voltage is OFF. As a result, the output of the buffer 61 is supplied to the gate of the pull-up load 12, and the impedance of the load device (the paralleled transistors 11 and 12) shows a good linearity; furthermore, since all the load current flowing through the load device (transistors 11 and 12) is taken as a signal current outside the driver circuit, current consumption can be reduced.

On the other hand, when the input signal (IN) is high "H", the pull-up load 11 is OFF and the pull-down load 21 is ON, while the pull-up transistor 41 is ON and the pull-down transistor 42 is ON. Further, the gate transistor 51 is OFF and the gate transistor 52 is ON. As a result, the output of the buffer 62 is supplied to the gate of the pull-down load 22, and the impedance of the load device (the paralleled transistors 21 and 22) shows a good linearity; furthermore, since all the load current flowing through the load device (transistors 21 and 22) is taken as a signal current outside the driver circuit (all the signal current is flown through the load device), current consumption can be reduced.

In this way, the sixth embodiment eliminates the need for the large-size switching transistors (transistors 111 and 116 in FIG. 16) used to turn on and off the load devices in the second embodiment, and has the advantage of being able to reduce the current consumption of the predriver for driving the front stage.

Figure 21:
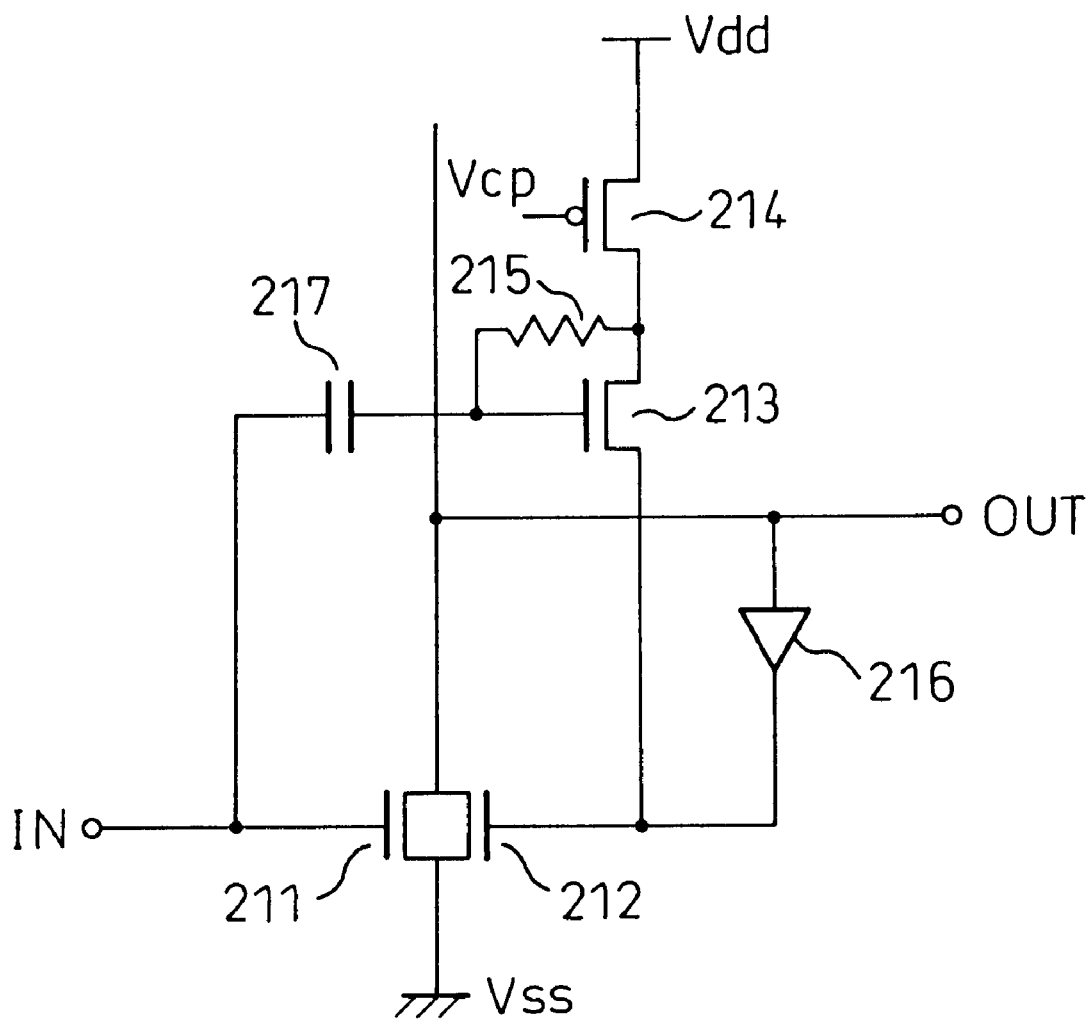
FIG. 21 is a circuit diagram showing a seventh embodiment of the driver circuit according to the present invention.

FIG. 21 is a circuit diagram showing a seventh embodiment of the driver circuit according to the present invention. In FIG. 21, reference numerals 211 and 212 are load devices (nMOS transistors), 213 is a switch (nMOS transistor), 214 is a current source (pMOS transistor), 215 is a resistor, and 216 is a gate voltage generating circuit (shifter).

As shown in FIG. 21, the seventh embodiment includes a current injection mechanism for temporarily speeding up the change of the gate voltage in order to shorten the switching time when the load device (transistor 211) makes an OFF to ON transition. The current injection mechanism here uses capacitive coupling, and a capacitor 217 is provided to couple the gate of the transistor (load device) 211 with the gate of the transistor 213.

With this capacitive coupling, when the gate voltage of the transistor 211 makes a transition from the low level "L" to the high level "H" (that is, when the load device changes from OFF to ON), the gate voltage of the transistor (load device) 212 is temporarily driven to the high level to increase the transition speed. The transition speed is also increased by capacitive coupling when the load device (211) makes an OFF to ON transition.

Figure 22:
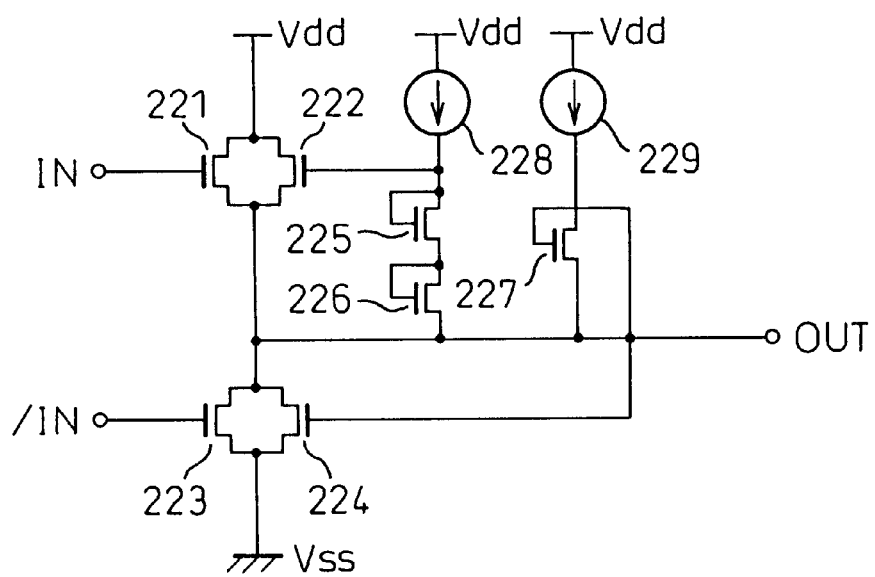
FIG. 22 is a circuit diagram showing an eighth embodiment of the driver circuit according to the present invention.

FIG. 22 is a circuit diagram showing an eighth embodiment of the driver circuit according to the present invention.

As can be seen from FIG. 22, in the eighth embodiment, the load devices 221, 222 and 223, 224 and the devices (transistors 225 to 227) used in the gate voltage generating circuit to generate shift voltages for the load devices are all constructed from transistors of the same channel conductivity type (in this embodiment, nMOS transistors).

In this way, since the load devices and the shift voltage generating transistors are constructed from transistors of the same conductivity type (nMOS transistors), and hence, the nonlinearity determining transistors are of the same conductivity type, the eighth embodiment has the advantage that the linear characteristic is relatively unaffected by process variation. Furthermore, using nMOS transistors offers the advantage that the drive transistors can be made smaller than when pMOS transistors are used.

Figure 23:
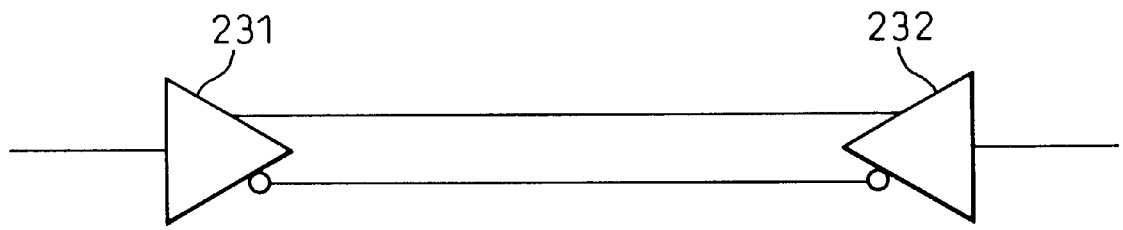
FIG. 23 is a circuit diagram showing a ninth embodiment of the driver circuit according to the present invention.

FIG. 23 is a circuit diagram showing a ninth embodiment of the driver circuit according to the present invention.

As shown in FIG. 23, the present invention is applied to a signal transmission system in which two driver circuits 231 and 232 are connected opposite each other with the output of each driver circuit terminating in the other. More specifically, the driver circuit of the present invention can be used in a bidirectional signal transmission system in which signals are carried in both directions over one signal line; since the output impedance of the driver circuit has a linearity that does not depend on voltage, impedance matching can be accomplished irrespective of the output state of the driver circuit or the magnitude of the input voltage, and signal transmission with reduced nonlinear error thus becomes possible.

As described above, according to the second mode of the present invention, it becomes possible to provide a driver circuit having excellent output impedance linearity for bidirectional transmission or multilevel transmission that can increase the efficiency of use of a signal transmission line and can reduce the number of signal lines without decreasing the signal transmission speed, and a signal transmission system using such a driver circuit.

Figure 24A:
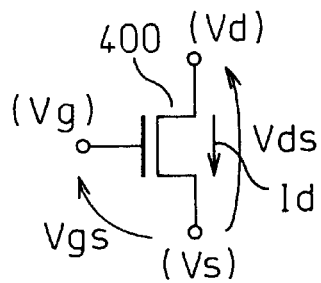
FIGS. 24A, 24B, and 24C are diagrams showing the basic functional configuration of a driver circuit according to a third mode of the present invention.
Figure 24B:
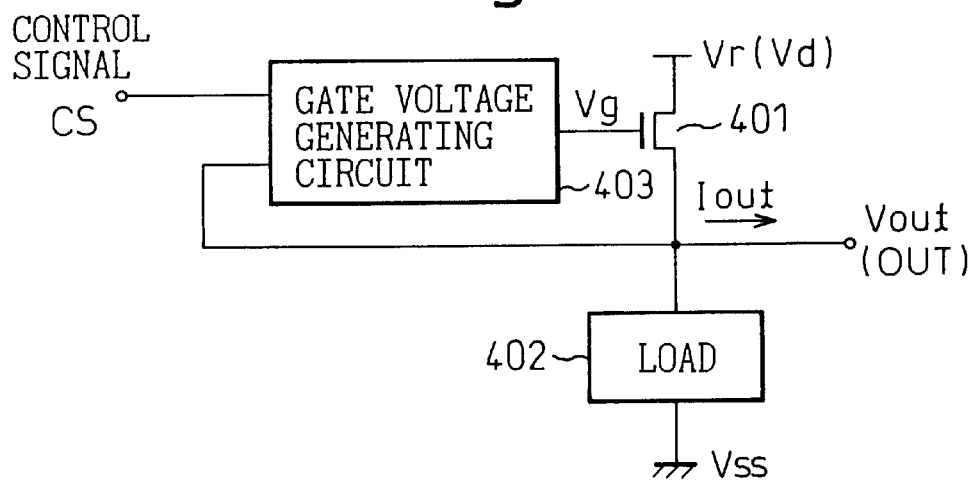
Figure 24C:
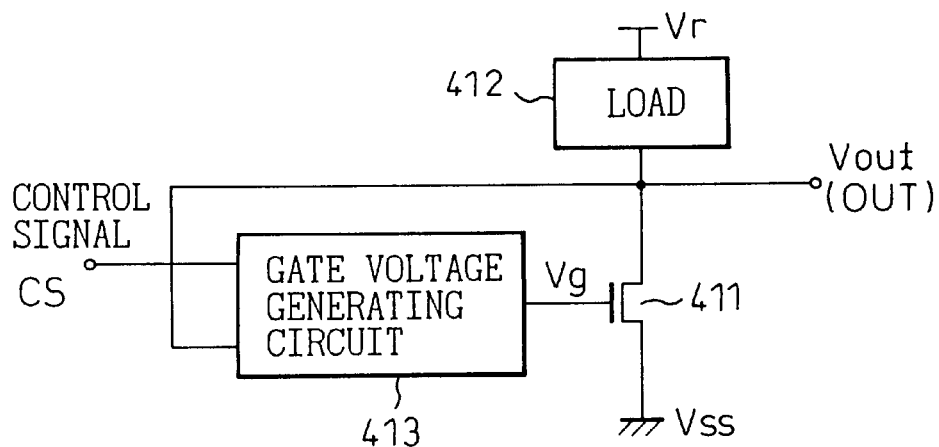

FIGS. 24A, 24B, and 24C are diagrams showing the basic functional configuration of a driver circuit according to the third mode of the present invention. The following description is given by taking an nMOS transistor as an example, but the basic principle is the same for the case of pMOS transistors or other types of transistors than MOS transistors.

As shown in FIG. 24A, the gate voltage (gate-source voltage) of the nMOS transistor 400 is denoted by Vgs, the drain voltage (drain-source voltage) by Vds, and the current flowing through this transistor is denoted by Id. The threshold voltage of the transistor is designated by Vth.

As shown in FIGS. 24B and 24C, the driver circuit according to the third mode of the present invention controls the gate voltage of the output transistor in the driver circuit in a manner dependent on both the control signal CS and the driver output voltage (voltage of the output signal line) Vout in order to provide output impedance of high linearity. FIG. 24B shows the configuration where the nMOS transistor 401 is used as a pull-up device, while FIG. 24C shows the configuration where the nMOS transistor 412 is used as a pull-down device.

An analysis will be given below when the output stage transistor in the driver circuit has the square-low characteristic shown below. The following equation is used for the analysis.

$$Id = \beta((Vgs - Vth)Vds - (1/2)Vds^2))\ldots Vgs > Vds + Vth \quad (1a)$$

$$= (\beta/2)(Vgs - Vth)^2 \ldots Vgs < Vds + Vth \quad (1b)$$

First, in the case of the pull-up nMOS transistor 401 shown in FIG. 24B, output voltage Iout=Id is taken from the source while holding the drain voltage constant (Vd=Vr). Here, Vds=Vd−Vs, and Vs=Vout (output voltage). Hence $$Vg = (Vout + Vg0)/2) + Vth + Vr/2 \quad Vg0 > Vr - Vout \quad (2a)$$

$$= SQRT(Vg0 * (Vr - Vs)) \quad Vg0 < Vr - Vout \quad (2b)$$

$$Iout=(\beta/2)Vg0*(Vr-Vout) \quad (2c)$$

Therefore, a linear characteristic can be obtained by the gate voltage generating circuit 403 applying the gate voltage shown above to the gate of the transistor 401.

Next, in the case of the pull-down nMOS transistor 411 shown in FIG. 24B, when Vds=Vout and Vgs=Vg, then $$Vg = (Vout + Vg0)/2) + Vth \quad Vg0 > Vout \quad (3a)$$

$$= SQRT(Vg0 * Vout) \quad Vg0 < Vout \quad (3b)$$

$$Iout=(\beta/2)Vg0*Vout \quad (3c)$$

Therefore, a linear characteristic can likewise be obtained by the gate voltage generating circuit 413 applying the gate voltage shown above to the gate of the transistor 411.

In this way, according to the driver circuit pertaining to the third mode of the present invention, internal impedance having excellent linearity can be achieved by compensating for the nonlinearity in the transistor's current-voltage characteristic. Then, a driver circuit whose output impedance is relatively independent of voltage can be realized by using this internal impedance as the load device for the driver circuit.

Figure 25A:
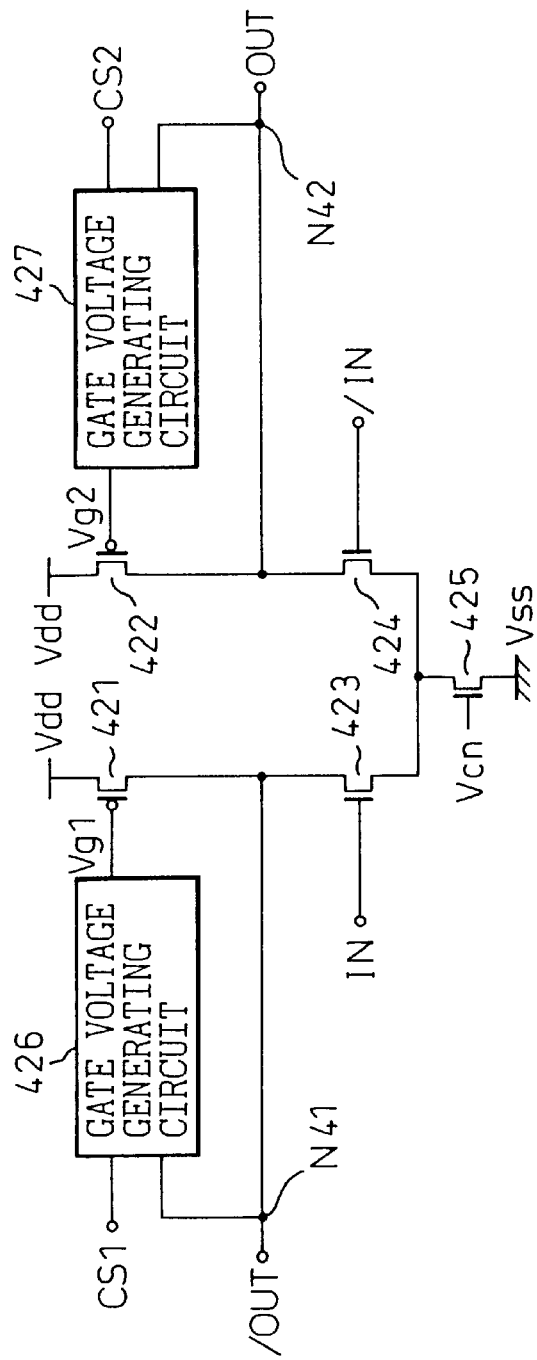
FIGS. 25A and 25B are circuit diagrams showing a 10th embodiment of the driver circuit according to the present invention.
Figure 25B:
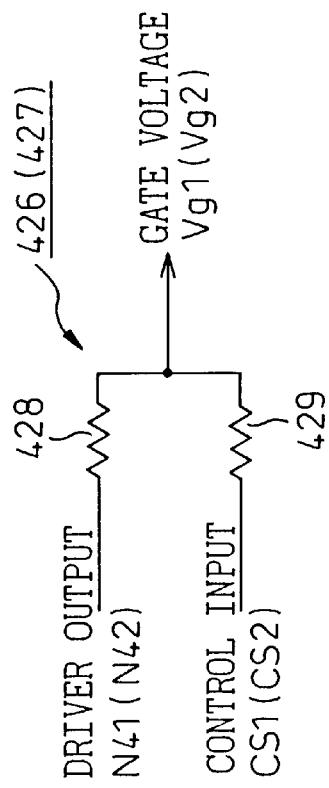

FIGS. 25A and 25B are circuit diagrams showing a 10th embodiment of the driver circuit according to the present invention. In FIGS. 25A and 25B, reference numerals 421 and 422 are pMOS transistors, 423 to 425 are nMOS transistors, and 426 and 427 are gate voltage generating circuits.

As shown in FIG. 25A, the gate voltage generating circuit 426 receives a control signal CS1 and a signal (the voltage of the output signal line, i.e., an output voltage of the driver circuit) taken from an output node N41 of the driver circuit, and generates a gate voltage Vg1 which is applied to the gate of the transistor 421. On the other hand, the gate voltage generating circuit 427 receives a control signal CS2 and a signal (an output voltage of the driver circuit) taken from an output node N42 of the driver circuit, and generates a gate voltage Vg2 which is applied to the gate of the transistor 422.

Here, as shown in FIG. 25B, each gate voltage generating circuit 426 (427) receives the input control voltage CS1 (CS2) and the output voltage of the driver circuit, and generates the gate voltage Vg1 (Vg2) with a resistive divider consisting of resistors 428 and 429. The transistors 423 and 424 forms an nMOS differential pair, and a bias voltage Vcn is applied to the gate of the transistor 425.

In the 10th embodiment, currents supplied from the constant-current driver constructed from the nMOS differential pair 423, 424 are supplied to the pMOS loads (pMOS transistors) 421 and 422 to produce output voltages (/OUT and OUT). Since the gate voltage of each of the pMOS transistors 421 and 422 varies with the signal voltage (IN, /IN), the voltage dependence of the impedance of each load device (421, 422) is reduced, achieving good impedance linearity.

Figure 26:
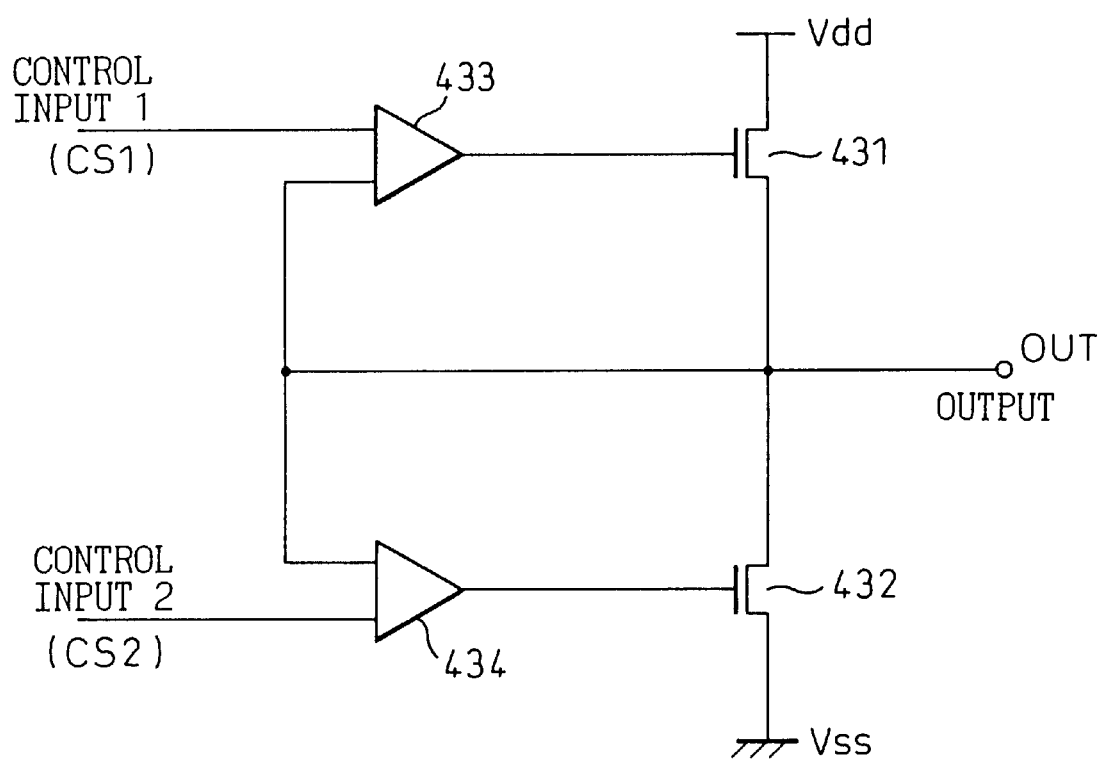
FIG. 26 is a circuit diagram showing an 11th embodiment of the driver circuit according to the present invention.

FIG. 26 is a circuit diagram showing an 11th embodiment of the driver circuit according to the present invention; reference numerals 431 and 432 are nMOS transistors, and 433 and 434 are gate voltage generating circuits.

As shown in FIG. 26, the driver circuit of the 11th embodiment comprises the pull-up nMOS transistor 431 connected to a high voltage supply line Vdd and the pull-down nMOS transistor 432 connected to a low voltage supply line Vss.

The pull-up transistor 431 is ON when the pull-down transistor 432 is OFF, and is OFF when the latter is ON. That is, in the 11th embodiment, since one or the other of the load devices is always OFF, all the load current is taken as a signal current outside the driver, and thus the current consumption can be reduced (for example, by half compared with the 10th embodiment).

Figure 27:
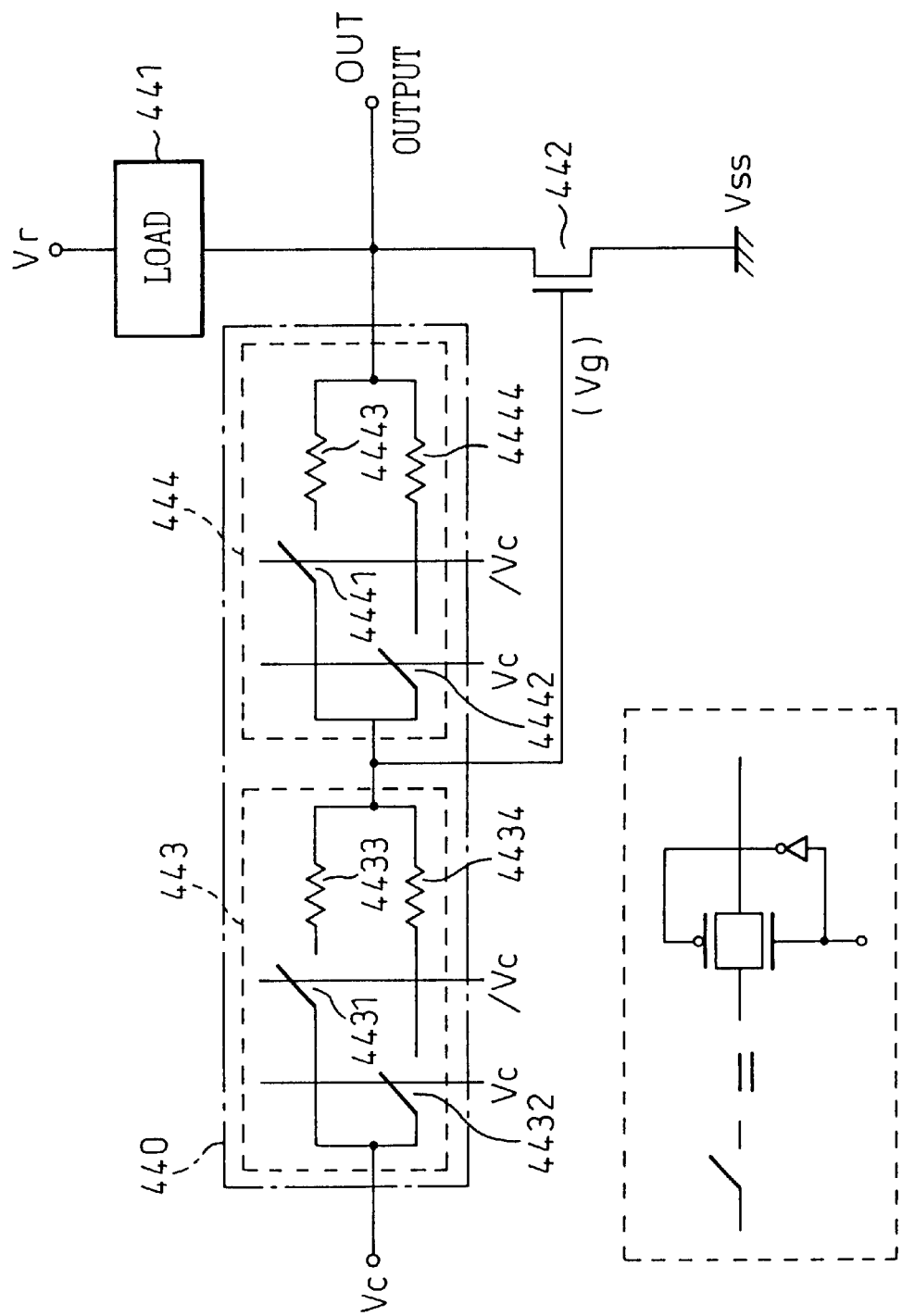
FIG. 27 is a circuit diagram showing a 12th embodiment of the driver circuit according to the present invention.

FIG. 27 is a circuit diagram showing a 12th embodiment of the driver circuit according to the present invention. In FIG. 27, reference numeral 441 is a load, 442 is an nMOS transistor (control transistor), and 440 is a gate voltage generating circuit (control circuit).

The gate voltage generating circuit 440 is made up of gate voltage generators 443 and 444; the gate voltage generator 443 comprises switches 4431 and 4432 and resistors 4433 and 4434, and the gate voltage generator 444 comprises switches 4441 and 4442 and resistors 4443 and 4444. Reference characters Vc and /Vc designate control voltages (control signals), where /Vc means inverted Vc. The switches 4431, 4432, 4441, and 4444 are each formed, for example, from a CMOS transfer gate.

The 12th embodiment is similar to the foregoing embodiment in that the gate voltage generating circuit 440 determines the gate voltage (Vg) based on the driver output voltage (OUT) and the control voltages by using resistive dividers, but the difference is that the resistive dividing ratio is varied according to the state (ON or OFF) of the driver by the transistor switches (transfer gates) controlled by the complementary control voltages (Vc and /Vc).

More specifically, when the control voltage Vc is high "H" (the control voltage /Vc is low "L"), the switches 4431 and 4441 are OFF and the switches 4432 and 4442 are ON, so that the voltage (Vg) generated by resistively dividing the control voltage Vc and output voltage (OUT) through the resistors 4434 and 4444, respectively, is applied to the gate of the transistor 442. On the other hand, when the control voltage Vc is low "L" (the control voltage /Vc is high "H"), the switches 4431 and 4441 are ON and the switches 4432 and 4442 are OFF, so that the voltage (Vg) generated by resistive dividing through the resistors 4433 and 4443 is applied to the gate of the transistor 442. Here, the voltage dividing ratio by the resistors 4434 and 4444 and the voltage dividing ratio by the resistors 4433 and 4443 are set at different predetermined values so as to improve not only the impedance linearity against the output voltage (OUT) but also the impedance linearity against the control voltages (Vc and /Vc).

Accordingly, by choosing the values of the resistors 4433, 4434, 4443, and 4444 so as to provide an output impedance Zo when the control voltage Vc is raised to the high supply voltage Vdd and an output impedance 2Zo when the control voltage Vc is at Vdd/2, the driver can be adjusted so that its output conductance is approximately proportional to the control voltage. The 12th embodiment has the further advantage that the output impedance of the push-pull driver can be maintained substantially constant even during a transient period when the driver output is changing.

Figure 28:
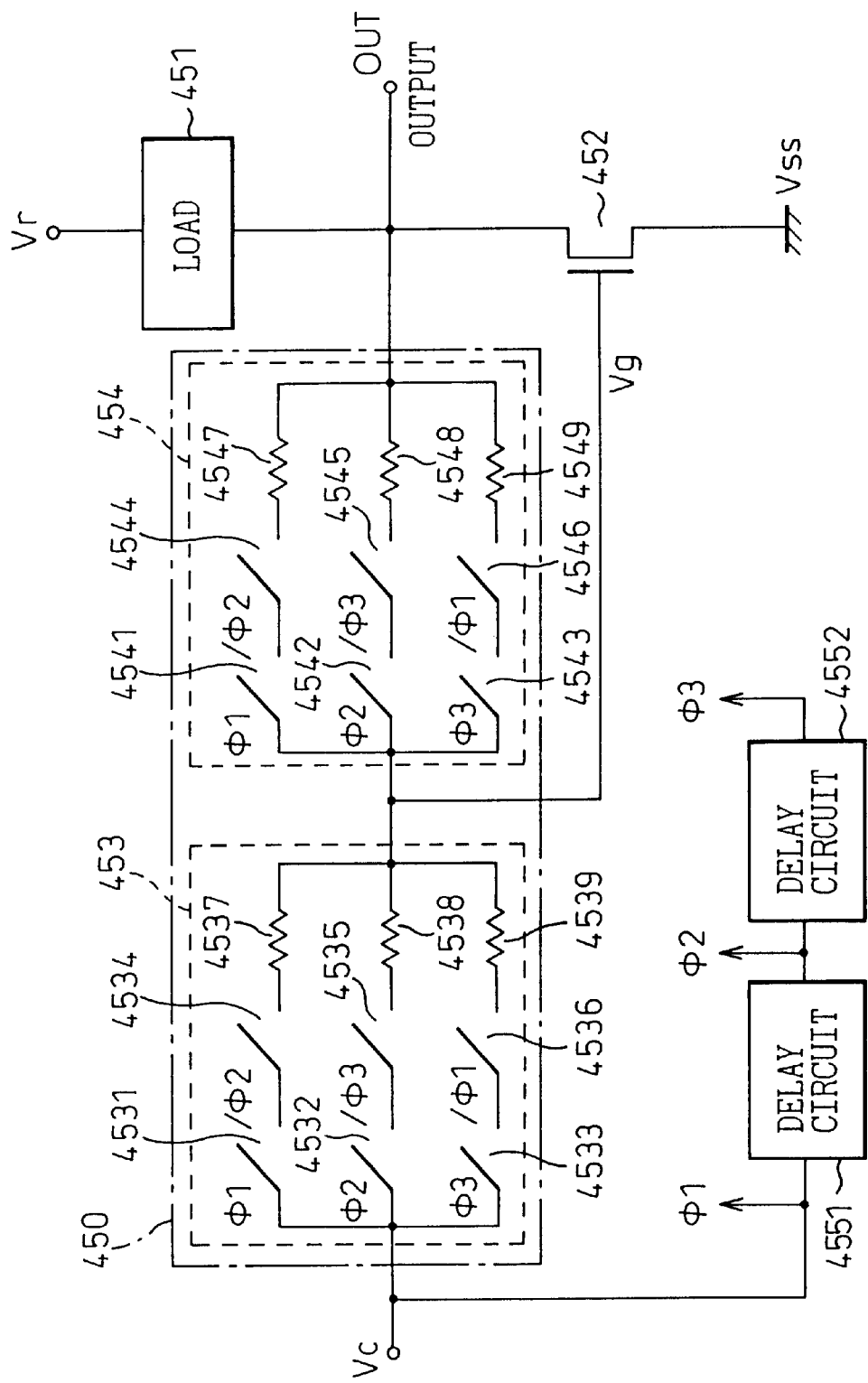
FIG. 28 is a circuit diagram showing a 13th embodiment of the driver circuit according to the present invention.

FIG. 28 is a circuit diagram showing a 13th embodiment of the driver circuit according to the present invention, which is a modification of the above-described 12th embodiment. In FIG. 28, reference numeral 451 is a load, 452 is an nMOS transistor (control transistor), 450 is a gate voltage generating circuit (control circuit), and 4551 and 4552 are delay circuits.

The gate voltage generating circuit 450 is made up of gate voltage generators 453 and 454; the gate voltage generator 453 comprises switches 4531 to 4536 and resistors 4537 to 4539, and the gate voltage generator 454 comprises switches 4541 to 4546 and resistors 4547 to 4549. The switches 4531 to 4536 and 4541 to 4546 are each formed, for example, from a CMOS transfer gate, as in the foregoing embodiment.

In the 13th embodiment, the resistance value of the voltage dividing circuit used in the gate voltage generating circuit 450 is switched between three values using the switches (transfer gates) 4531 to 4536 and 4541 to 4546. That is, each dividing resistor is switched by a switch consisting of two transfer gates in series, and the respective switches are controlled by control clocks φ1, φ2, and φ3 (/φ1, /φ2, and /φ3) of different phases.

More specifically, the first dividing resistor pair (resistors 4537 and 4547) is enabled when the control clocks φ1 and /φ2 both go to the high level "H", the second dividing resistor pair (resistors 4538 and 4548) is enabled when the control clocks φ2 and /φ3 both go to the high level "H", and the third dividing resistor pair (resistors 4539 and 4549) is enabled when the control clocks φ3 and /φ1 both go to the high level "H". The control clocks (φ1) φ2 and φ3 are generated in sequence by the delay circuits 4551 and 4552.

According to the 13th embodiment, since the input/output characteristic of the control circuit can be set differently among three different states, for example, the state in which the driver circuit is ON, the state in which the conductance is one-half of the value in the ON state, and the state in which the driver circuit is OFF, the output conductance of the driver circuit can be made substantially linearly dependent on the control signal.

Figure 29:
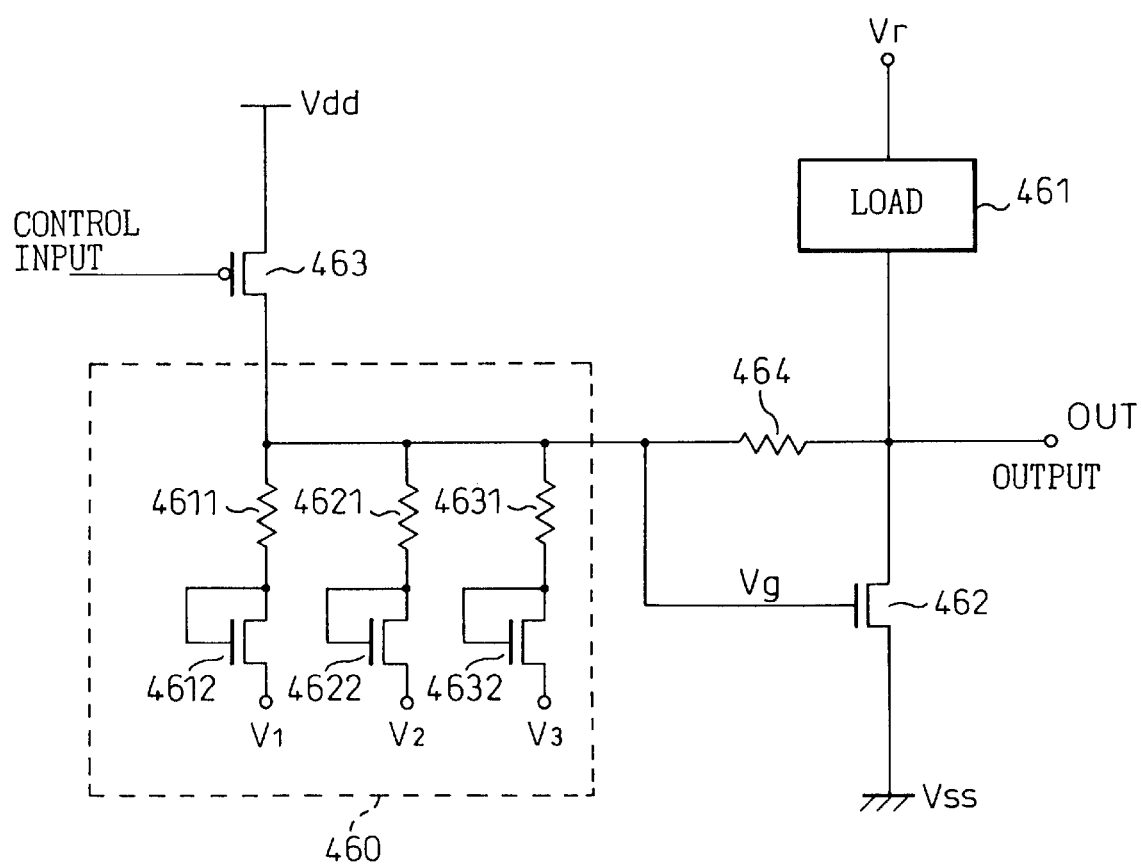
FIG. 29 is a circuit diagram showing a 14th embodiment of the driver circuit according to the present invention.

FIG. 29 is a circuit diagram showing a 14th embodiment of the driver circuit according to the present invention.

The 14th embodiment is basically the same as the foregoing 12th and 13th embodiments, but differs in that the gate voltage generating circuit 460 is configured as a so-called polygonal approximation circuit comprising a plurality of diode-connected transistors and resistors (4611, 4612; 4621, 4622; and 4631, 4632). Reference numeral 463 is a pMOS transistor to which the control signal is applied, and 464 is a resistor which acts as a reference resistor for resistive dividing.

The polygonal approximation circuit shows the characteristic of a polygonal line having a plurality of bending points, since the dividing ratio in the voltage dividing circuit changes each time the output voltage exceeds the reference voltage value. In the case of the 14th embodiment shown in FIG. 29, an ideal input/output characteristic can be approximated by a straight line having three bending points. It will be appreciated here that the number of diode-connected transistor/resistor pairs is not limited to three. Also, in practice, since the diode characteristic is not steep, not a polygonal line but a curve which is closer to the ideal characteristic is obtained.

Figure 30:
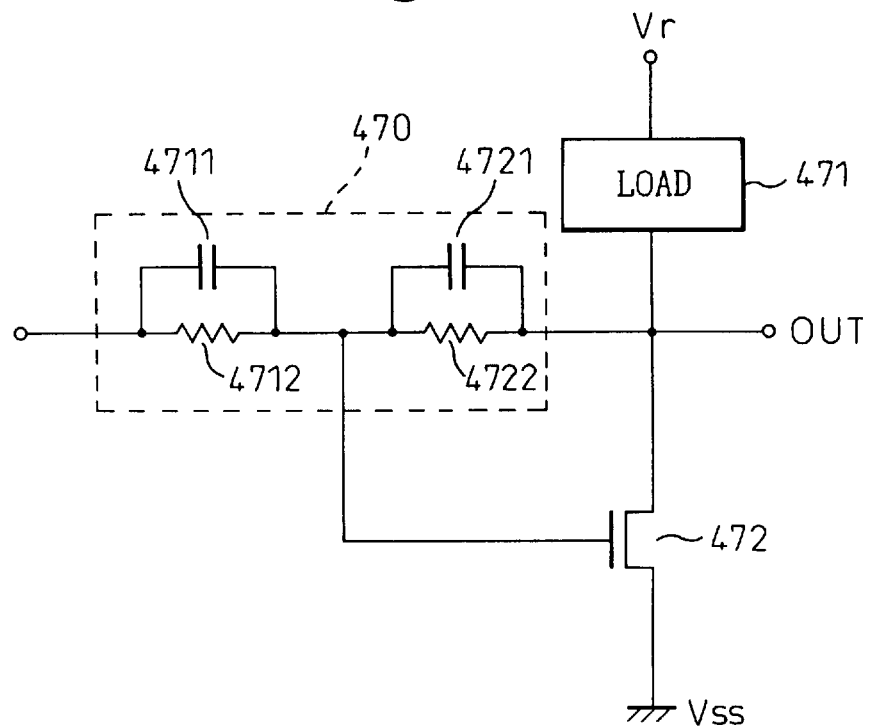
FIG. 30 is a circuit diagram showing a 15th embodiment of the driver circuit according to the present invention.

FIG. 30 is a circuit diagram showing a 15th embodiment of the driver circuit according to the present invention.

The 15th embodiment is similar to the 12th embodiment, except that capacitors (4711 and 4721) are connected in parallel with the respective resistive elements (4712 and 4722) in the resistive dividing circuit. The values of the capacitors 4711 and 4721 are chosen so that the gate voltage versus control voltage characteristic determined by the capacitive dividing is such that the output impedance of the driver circuit provides conductance one-half of that in the ON state.

For example, when the control voltage is Vdd/2, statically a value close to one half the value in the ON state can be obtained for the output impedance of the driver circuit, but in practice, an error occurs since the control voltage is undergoing a transient change. In view of this, in the 15th embodiment, the transient error is reduced by introducing the capacitive dividing using the capacitors 4711 and 4721, and thereby determining the dividing ratio at high frequencies by the capacitors.

Figure 31:
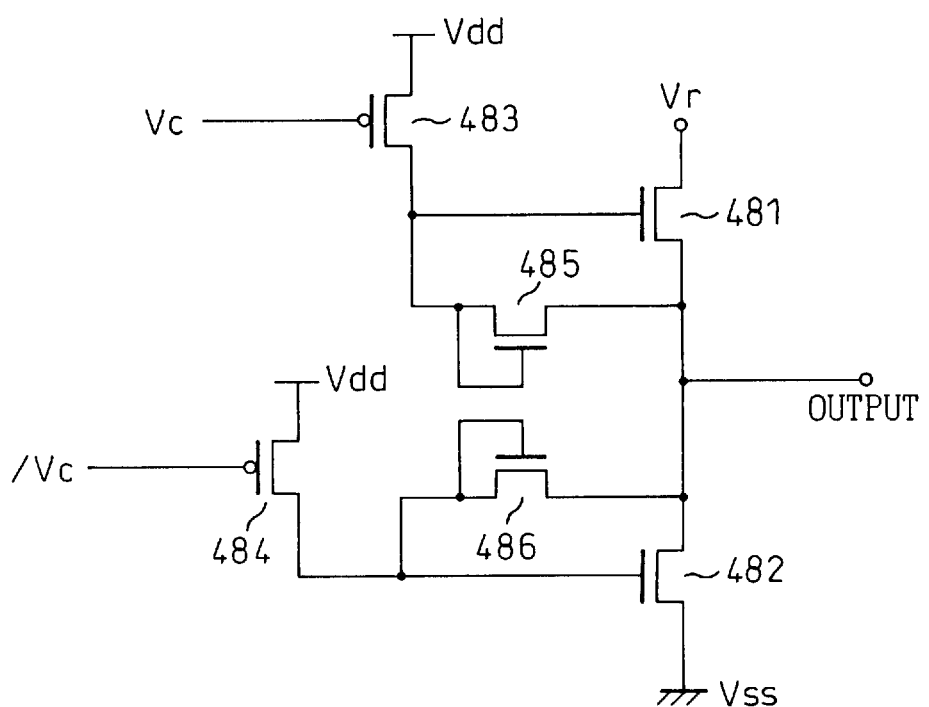
FIG. 31 is a circuit diagram showing a 16th embodiment of the driver circuit according to the present invention.

FIG. 31 is a circuit diagram showing a 16th embodiment of the driver circuit according to the present invention.

In the 16th embodiment, the devices for applying feedback from the output node (OUT) of the driver circuit to the gates of the transistors 481 and 482 are formed from diode-connected transistors (in this embodiment, nMOS transistors) 485 and 486 that use the same type of carrier as the driver-stage transistors (481 and 482), and pMOS transistors 483 and 484 to which the control voltages Vc and /Vc are supplied are used as the load devices.

According to the 16th embodiment, if the threshold voltage Vth of any one of the output-stage transistors (481 and 482) becomes higher due to process variation or the like, its gate voltage is increased correspondingly, minimizing the effects of such process variation.

Figure 32:
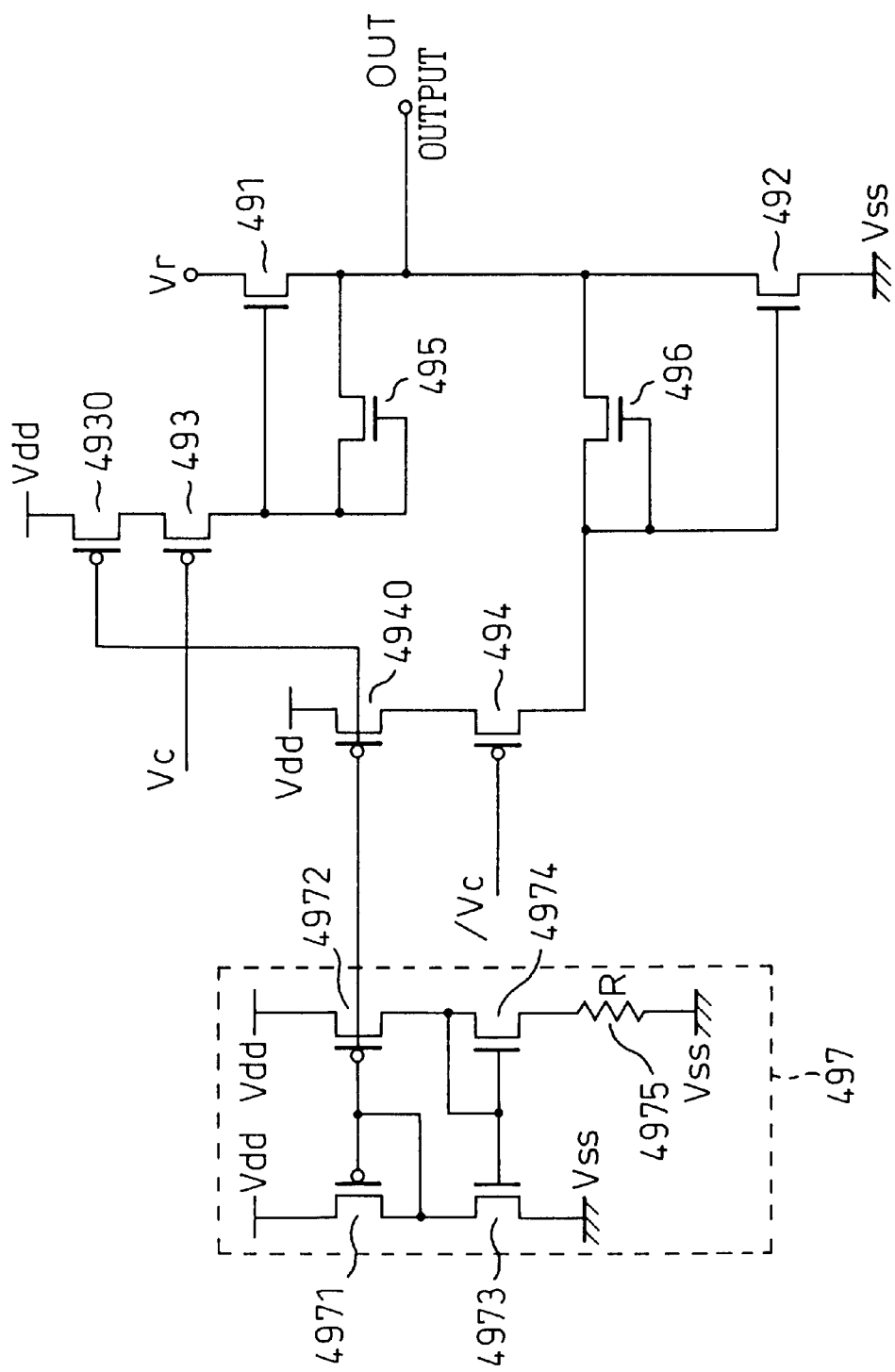
FIG. 32 is a circuit diagram showing a 17th embodiment of the driver circuit according to the present invention.

FIG. 32 is a circuit diagram showing a 17th embodiment of the driver circuit according to the present invention.

As is apparent from a comparison of FIGS. 31 and 32, transistors 491 to 496 in the 17th embodiment correspond to the transistors 481 to 486 in the foregoing 16th embodiment. In the 17th embodiment, the pMOS load transistors 483 and 484 in the 16th embodiment are replaced by two series-connected pMOS transistors 4930 and 493 and two series-connected pMOS transistors 4940 and 494, respectively, and a gate voltage for maintaining conductance constant is applied to the gate of each of the transistors 4930 and 4940.

That is, a bias generating circuit 497, which comprises pMOS transistors 4971 and 4972, nMOS transistors 4973 and 4974, and a resistor (external reference resistor) 4975, generates a gate bias voltage such that the conductance is proportional to the external reference voltage 4975. According to the 17th embodiment, since the pMOS transistors can also be compensated for process variation, the process dependence can be further reduced compared with the above-described 16th embodiment.

Figure 33:
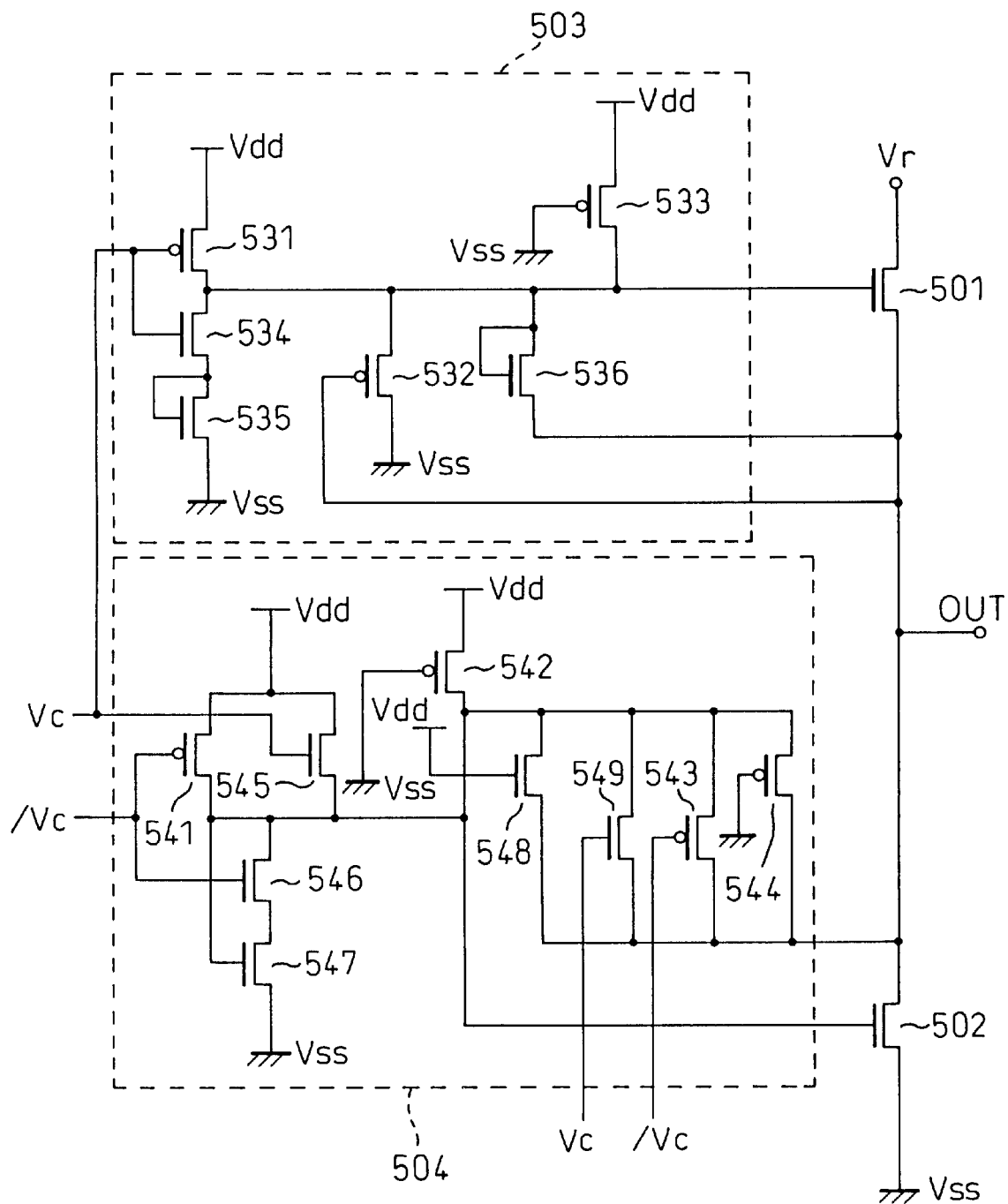
FIG. 33 is a circuit diagram showing an 18th embodiment of the driver circuit according to the present invention.

FIG. 33 is a circuit diagram showing an 18th embodiment of the driver circuit according to the present invention.

As shown in FIG. 33, in the 18th embodiment, a control circuit (gate voltage generating circuit) 503 for driving a transistor 501 on the high voltage side of the driver stage and a control circuit (gate voltage generating circuit) 504 for driving a transistor 502 on the low voltage side are made asymmetric relative to each other in corresponding fashion to the respective voltages. Here, voltage Vdd is set, for example, at 1.8 volts, Vr at 0.9 volt, and Vss at 0 volt.

The gate voltage generating circuit 503 comprises pMOS transistors 531 to 533 and nMOS transistors 534 to 536, and includes an inverter (transistors 531 and 534) as a predriver. Here, as in the 16th embodiment shown in FIG. 31, the output voltage (OUT) is fed back to the gate of the transistor 501 through the diode-connected transistor 536. The transistor 536 is formed from an nMOS transistor, the same conductivity type as the output transistor 501, to minimize the effects of process variation.

On the other hand, the gate voltage generating circuit 504 comprises pMOS transistors 541 to 544 and nMOS transistors 545 to 549. Here, the switching operations of the nMOS transistor 549 and the pMOS transistor 543 are controlled by the control signals Vc and /Vc, as in the 12th embodiment shown in FIG. 27. These transistors 549 and 543 function not only as switching devices but also as resistive devices. With these transistors, the gate voltage of the transistor 502 is controlled according to the levels of the control signals Vc and /Vc, to improve the linearity of the output impedance.

The above embodiments have been described by taking MOS (CMOS) transistors as examples of the transistors, but the invention is not limited to this particular type of transistor.

As described in detail above, according to the second and third modes of the present invention, it becomes possible to provide a driver circuit having excellent output impedance linearity for bidirectional transmission or multilevel transmission that can increase the efficiency of use of a signal transmission line and can reduce the number of signal lines without decreasing the signal transmission speed, and a signal transmission system using such a driver circuit.

Many different embodiments of the present invention may be constructed without departing from the spirit and scope of the present invention, and it should be understood that the present invention is not limited to the specific embodiments described in this specification, except as defined in the appended claims.

What is claimed is:

1. A receiver for bidirectional signal transmission in which signals are sent and received in both directions over a signal transmission line, comprising:

a signal line connected to said signal transmission line;

a replica driver for outputting a replica voltage;

a signal line voltage buffer circuit for buffering a voltage of said signal line;

a hybrid circuit for outputting a received signal by separating said received signal from the signal line voltage buffered by said voltage buffer circuit, wherein said hybrid circuit includes a hold circuit for holding a signal, a first switch circuit connected to said replica driver, and a second switch circuit connected to said voltage buffer circuit; and a decision circuit for making a decision on the logic value of said received signal output by said hybrid circuit.

2. The receiver as claimed in claim 1, wherein said decision circuit generates a sum of a signal value obtained at the time that said hybrid circuit makes a decision on the logic value of said received signal separated and output by said hybrid circuit and a value obtained by multiplying an earlier obtained given signal value by a coefficient, and makes the decision by using the value of said generated sum.

3. The receiver as claimed in claim 1, wherein said buffer circuit is a voltage buffer circuit, and said hybrid circuit is a capacitive coupling hybrid circuit.

4. The receiver as claimed in claim 3, wherein said voltage buffer circuit has a voltage gain of nearly unity, and said voltage buffer circuit and said signal line are coupled together by a capacitor, and wherein during a non-operating period of said voltage buffer circuit, a node on the input side of said capacitor is connected to an output of said voltage buffer circuit and an input node of said voltage buffer circuit is precharged to a prescribed potential, thereby compensating for an offset voltage of said voltage buffer circuit.

5. The receiver as claimed in claim 3, further comprising a reference voltage output circuit for controlling, in accordance with an output sequence of a driver, a reference voltage for driving an input node of said capacitive coupling hybrid circuit.

6. The receiver as claimed in claim 5, wherein said reference voltage output circuit comprises:

a control voltage generating circuit for generating a plurality of control voltages in accordance with data of a signal sequence being sent out by said driver;

a plurality of reference voltage buffers for receiving said control voltages and for generating respective reference voltages; and a selection circuit for selecting an output of one of said plurality of reference voltage buffers in accordance with the data of said signal sequence.

7. The receiver as claimed in claim 1, wherein:

said buffer circuit is a transconductor for performing voltage-to-current conversion; and said hybrid circuit converts the voltage of said signal line and a signal voltage of a replica driver into currents by using said transconductor, and causes a current corresponding to the difference between said converted currents to flow into a load device to obtain the difference between the voltage of said signal line and the signal voltage of said replica driver, thereby separating said received signal for output.

8. The receiver as claimed in claim 7, wherein:

an offset compensating circuit including a first transistor and a second hold capacitor is connected to the load device to which the current from said transconductor is supplied in said hybrid circuit; and in said offset compensating circuit, during a non-operating period of said buffer circuit, said first transistor is connected in a diode-connected configuration and said second hold capacitor is connected to a gate of said first transistor, while during an operating period of said buffer circuit, a voltage on said second hold capacitor is the gate voltage of said first transistor.

9. The receiver as claimed in claim 8, wherein the current from said transconductor is held using a hold circuit of a folded structure having a third hold capacitor and a second transistor, and wherein during a sampling period, said third hold capacitor is connected to a gate of said second transistor connected in a diode-connected configuration and, during a holding period, said third hold capacitor is disconnected from said gate and an output current from said hold circuit is coupled to a load device that follows said hold circuit, thereby generating a weighted sum of signals taken at two adjacent sampling instants and thereafter making the decision using said weighted sum.

10. The receiver as claimed in claim 1, wherein said buffer circuit includes at an output stage thereof a push-pull source follower stage comprising an nMOS device and a pMOS device.

11. A receiver for bidirectional signal transmission in which signals are sent and received in both directions over a signal transmission line, comprising:

a signal line connected to said signal transmission line;

a first hold capacitor for holding a signal;

a hybrid circuit for outputting a received signal by separating said received signal from a voltage of said signal line;

a reference voltage output circuit for outputting in accordance with an output sequence of a driver a reference voltage for driving an input node of said hybrid circuit; and a decision circuit for making a decision on the logic value of said received signal separated and output by said hybrid circuit.

12. The receiver as claimed in claim 11, wherein said reference voltage output circuit comprises:

a control voltage generating circuit for generating a plurality of control voltages in accordance with data of a signal sequence being sent out by said driver;

a plurality of reference voltage buffers for receiving said control voltages and for generating respective reference voltages; and a selection circuit for selecting an output of one of said plurality of reference voltage buffers in accordance with the data of said signal sequence.

13. A hybrid circuit for bidirectional signal transmission in which signals are sent and received in both directions over a signal transmission line, wherein:

said hybrid circuit is a capacitive coupling hybrid circuit having a hold capacitor for holding a signal, and wherein an input signal from said signal transmission line is supplied to said hold capacitor via a buffer circuit, and a received signal is output by separating said received signal from a signal line voltage buffered by said buffer circuit.

14. The hybrid circuit as claimed in claim 13, further comprising a reference voltage output circuit for outputting, in accordance with an output sequence of a driver, a reference voltage for driving an input node of said capacitive coupling hybrid circuit.

15. The hybrid circuit as claimed in claim 14, wherein said reference voltage output circuit comprises:

a control voltage generating circuit for generating a plurality of control voltages in accordance with data of a signal sequence being sent out by said driver;

a plurality of reference voltage buffers for receiving said control voltages and for generating respective reference voltages; and a selection circuit for selecting an output of one of said plurality of reference voltage buffers in accordance with the data of said signal sequence.

16. The hybrid circuit as claimed in claim 13, wherein said hybrid circuit receives an output signal of a replica driver, which outputs a signal corresponding to an output of a driver that amplifies a signal and outputs said amplified signal onto said signal transmission line, an input signal from said signal transmission line, and a reference voltage, and separates said received signal for output.

17. The hybrid circuit as claimed in claim 16, wherein said hybrid circuit converts the voltage of said signal transmission line and the output voltage of said replica driver into currents by using a transconductor, and causes a current corresponding to the difference between said converted currents to flow into a load device to obtain the difference between the voltage of said signal transmission line and the output voltage of said replica driver, thereby separating said received signal for output.

18. The hybrid circuit as claimed in claim 17, wherein:

an offset compensating circuit comprising a first transistor and a first hold capacitor is connected to the load device to which the current from said transconductor is supplied in said hybrid circuit; and in said offset compensating circuit, during a non-operating period of said buffer circuit, said first transistor is connected in a diode-connected configuration and said first hold capacitor is connected to a gate of said first transistor while, during an operating period of said buffer circuit, a voltage on said first hold capacitor is the gate voltage of said first transistor.

19. The hybrid as claimed in claim 18, wherein the current from said transconductor is held using a hold circuit of a folded structure having a second hold capacitor and a second transistor and wherein, during a sampling period, said second hold capacitor is connected to a gate of said second transistor connected in a diode-connected configuration and, during a holding period, said second hold capacitor is disconnected from said gate and an output current from said hold circuit is coupled to a load device that follows said hold circuit, thereby generating a weighted sum of signals taken at two adjacent sampling instants and thereafter making the decision using said weighted sum.

20. The receiver as claimed in claim 1, wherein said hold circuit is a first hold capacitor.

21. The receiver as claimed in claim 1, wherein said hybrid circuit subtracts the replica voltage from the signal line voltage.

22. The receiver as claim in claim 1, wherein said first switch circuit and said second switch circuit are turned ON prior to sampling and said first switch is turned OFF when sampling.

* * * * *